(12) United States Patent
Khan et al.

(10) Patent No.: US 12,362,941 B2
(45) Date of Patent: Jul. 15, 2025

(54) SYSTEMS AND METHODS FOR DISTRIBUTED LEDGER MIGRATION

(71) Applicant: Verizon Patent and Licensing Inc., Basking Ridge, NJ (US)

(72) Inventors: Ahmed A. Khan, Plano, TX (US); Ravi G. Thota, Hyderabad (IN); Jeaha Yang, Darien, CT (US); Praveen A. Reddy, Hyderabad (IN); Krupakar Jonnalagadda, Hyderabad (IN); Rangesh Sripathi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 18/178,587

(22) Filed: Mar. 6, 2023

(65) Prior Publication Data

US 2024/0305468 A1  Sep. 12, 2024

(51) Int. Cl.
*H04L 9/32* (2006.01)
*G06F 16/23* (2019.01)
*H04L 9/00* (2022.01)

(52) U.S. Cl.
CPC ........ *H04L 9/3242* (2013.01); *G06F 16/2315* (2019.01); *G06F 16/2365* (2019.01); *H04L 9/3239* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,333,694 B1 * | 6/2019 | Hu | ...................... G06F 16/1805 |
| 10,366,388 B2 * | 7/2019 | Campero | ........... G06Q 20/3676 |

(Continued)

FOREIGN PATENT DOCUMENTS

| | | | | |
|---|---|---|---|---|
| CN | 107315756 A | * | 11/2017 | ........... G06F 16/172 |
| KR | 102140462 B1 | * | 8/2020 | ......... H04L 63/0838 |
| KR | 20200100773 A | * | 8/2020 | ............. H04L 63/12 |

OTHER PUBLICATIONS

Jollen Chen; (Flowchain: A Distributed Ledger Designed for Peer-to-Peer IoT Networks and Real-time Data Transactions); pp. 11; Published in Jan. 20, 2017.*

(Continued)

*Primary Examiner* — Ali H. Cheema

(57) ABSTRACT

A system may receive a request to migrate a first distributed ledger, maintained by a first distributed ledger management system, to a second distributed ledger management system, and may generate first verification information based on information recorded to the first distributed ledger. The system may instruct the second distributed ledger management system to establish a second distributed ledger, such that the second distributed ledger management system maintains the second distributed ledger. The system may also instruct the second distributed ledger management system to record the information, recorded to the first distributed ledger, to the second distributed ledger. The system may generate second verification information based on the information recorded to the second distributed ledger, and verify that the first distributed ledger has been migrated to the second distributed ledger management system by comparing the first verification information to the second verification information.

20 Claims, 14 Drawing Sheets

(56) References Cited

U.S. PATENT DOCUMENTS

| | | | |
|---|---|---|---|
| 10,515,409 B2* | 12/2019 | Creighton, IV | G06Q 40/04 |
| 10,896,006 B1* | 1/2021 | Tian | G06F 3/0649 |
| 11,716,211 B2* | 8/2023 | Schmeling | G06Q 30/0185 |
| | | | 713/156 |
| 2019/0333056 A1* | 10/2019 | Wilkinson | G06Q 20/389 |
| 2019/0333057 A1* | 10/2019 | Miller | G06Q 20/351 |
| 2019/0354963 A1* | 11/2019 | Di Iorio | G06Q 20/3678 |
| 2020/0327546 A1* | 10/2020 | Pennington | G06Q 20/065 |
| 2021/0132869 A1* | 5/2021 | Tian | G06F 3/0649 |
| 2023/0239155 A1* | 7/2023 | Pegoraro | H04L 63/123 |
| | | | 713/168 |
| 2023/0315719 A1* | 10/2023 | Honjo | H04L 9/50 |
| | | | 707/703 |
| 2023/0351374 A1* | 11/2023 | Huang | G06Q 20/3829 |

OTHER PUBLICATIONS

Consensys, "ConsenSys Quorum (Home page)," consensys.net, available at https://consensys.net/quorum/, visited Feb. 2, 2023.

R3, "Corda; Leading Platform for Regulated Industries (Home page)," corda.net, available at https://corda.net/, visited Feb. 2, 2023.

* cited by examiner

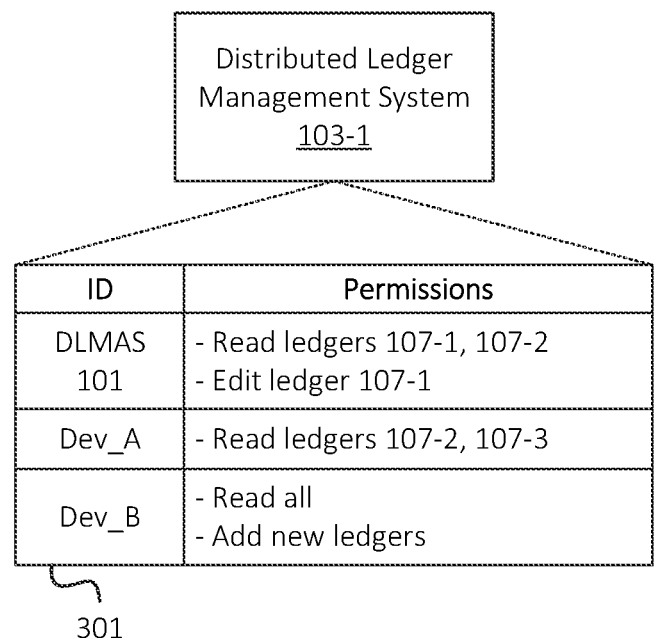
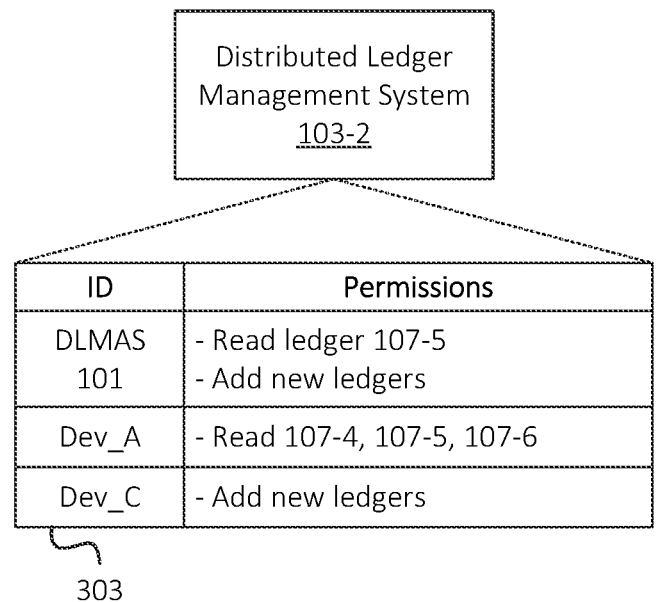
FIG. 3

SYSTEMS AND METHODS FOR DISTRIBUTED LEDGER MIGRATION

BACKGROUND

Distributed ledgers, such as blockchains, provide for the decentralized and secure storage of data. Distributed ledgers may further provide for the immutability of recorded data, as data may not be altered once recorded to a distributed ledger. Nodes associated with a distributed ledger may be implemented by hardware resources that are independent of each other, geographically distributed, and/or otherwise separate. A distributed ledger framework may implement, manage, etc. one or more distributed ledgers and/or nodes that implement such distributed ledgers. Different distributed ledger frameworks may utilize varied protocols or other techniques to implement distributed ledgers or nodes.

BRIEF DESCRIPTION OF THE DRAWINGS

FIGS. 3 and 4 illustrate examples of permission information, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the migration of a distributed ledger, implemented by a given distributed ledger framework, to another distributed ledger framework. A distributed ledger framework may refer to, for example, set of protocols, application programming interface ("APIs"), and/or other mechanisms via which distributed ledgers, and/or nodes that implement such distributed ledgers, are implemented or maintained. Examples of different distributed ledger frameworks include a Hyperledger Fabric ("HLF") framework, a ConsenSys Quorum framework, an R3 Corda framework, or the like. As discussed herein, some embodiments may provide for the migration of a distributed ledger, and/or portions thereof, from one framework to another, while maintaining some or all of the information of the distributed ledger after migration. For example, a distributed ledger that is implemented using an HLF framework may, in accordance with embodiments described herein, be migrated to a ConsenSys Quorum framework, an R3 Corda framework, etc. As such, flexibility is provided for different distributed ledger frameworks, and distributed ledgers on any given framework may be migrated to another in an agile and dynamic manner, in accordance with embodiments described herein.

Figure 1:
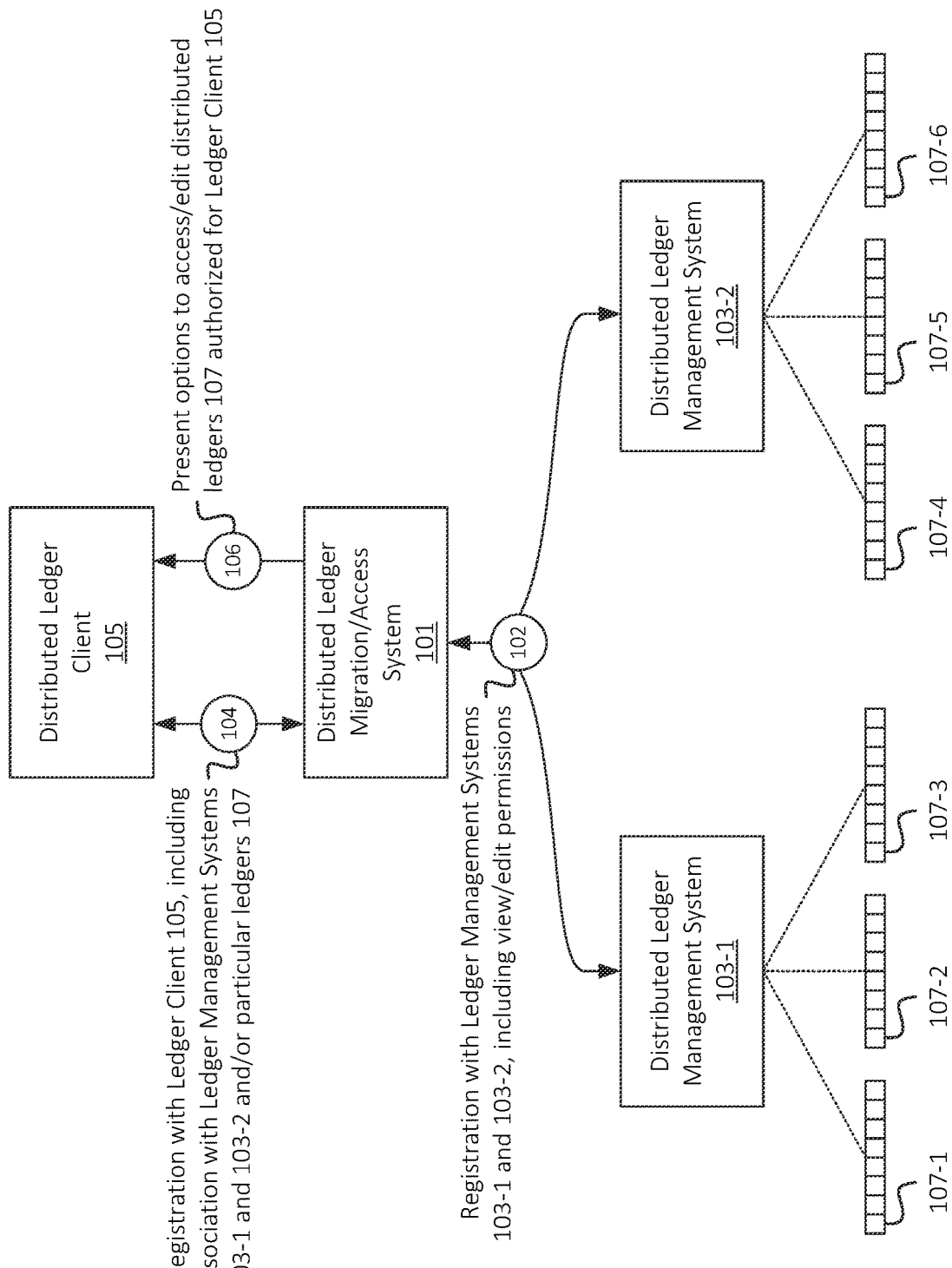
FIG. 1 illustrates an registration procedure in accordance with one or more embodiments described herein.

As shown in FIG. 1, Distributed Ledger Migration/Access System ("DLMAS") 101 may register (at 102) with one or more distributed ledger management systems, such as Distributed Ledger Management System ("DLMS") 103-1 and DLMS 103-2. DLMSs 103-1 and 103-2 may be, for example, associated with different distributed ledger frameworks (e.g., DLMS 103-1 may be associated with an HLF framework and DLMS 103-2 may be associated with a Quorum framework). Additionally, or alternatively, DLMSs 103-1 and 103-2 may be associated with the same distributed ledger framework (e.g., DLMS 103-1 may be associated with a first entity and/or may implement one or more distributed ledgers via a first set of devices and DLMS 103-2 may be associated with a second entity and/or may implement one or more distributed ledgers via a second set of devices). As discussed below, registering with multiple DLMSs 103 may allow for DLMAS 101 to facilitate the migration of distributed ledgers associated with DLMSs 103 to one or more other DLMSs 103. Further, in some embodiments, registering with a given DLMS 103 may allow for DLMAS 101 to provide access to one or more distributed ledgers associated with the given DLMS 103 to one or more other devices or systems, such as Distributed Ledger Client ("DLC") 105.

DLMSs 103 (e.g., DLMSs 103-1 and DLMS 103-2) may, as mentioned above, manage or maintain a set of nodes that maintain one or more distributed ledgers 107. In this sense, DLMSs 103 may be considered as managing, implementing, or otherwise being associated with such distributed ledgers 107. For example, as shown, DLMS 103-1 may manage a first set of distributed ledgers 107-1, 107-2, and 107-3, while DLMS 103-2 may manage a second set of distributed ledgers 107-4, 107-5, and 107-6.

Figure 2:
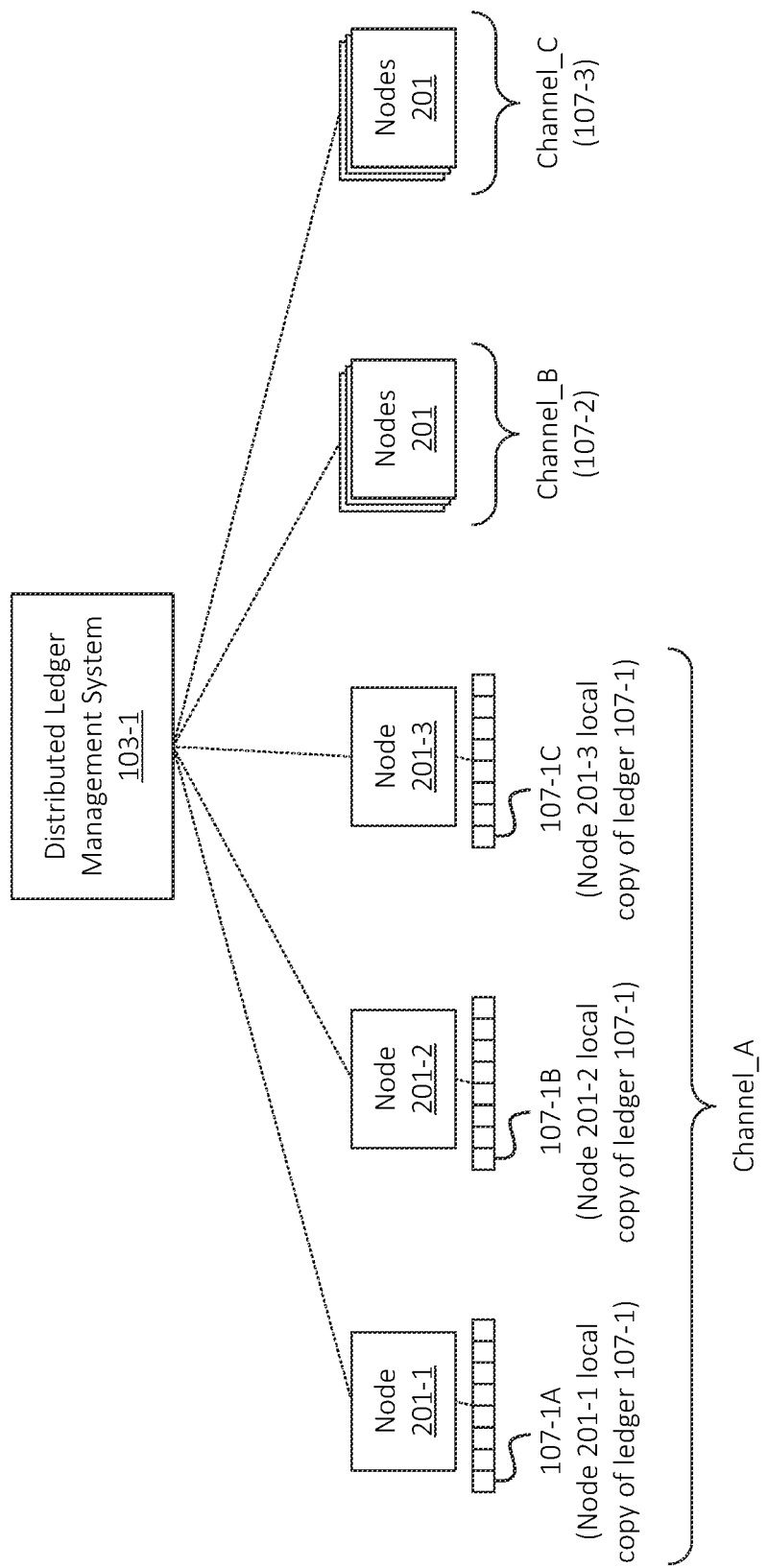
FIG. 2 illustrates an example of one or more channels associated with a distributed ledger management system, in accordance with some embodiments.

FIG. 2 illustrates an example of the management of distributed ledgers 107 by a given DLMS 103 (e.g., the management of distributed ledgers 107-1, 107-2, and 107-3 by DLMS 103-1). A given DLMS 103 may implement, configure, may be communicatively coupled to, and/or may otherwise be associated with multiple nodes 201. A particular node 201 may be, for example, a particular device, a particular container, a particular instance, etc. that performs one or more operations to maintain a respective distributed ledger 107 and/or perform other operations as defined by a given distributed ledger framework (e.g., as instructed or configured by a respective DLMS 103). Such operations may include recording new entries to distributed ledger 107, providing copies of distributed ledger 107 in response to queries, validating entries proposed to be recorded to distributed ledger 107, and/or other suitable operations. DLMS 103 may implement, may configure, or may otherwise be associated with an orchestration and/or containerization system (e.g., the open source Kubernetes API or other suitable API or system) that configures, provisions, instantiates, etc. nodes 201.

In the example of FIG. 2, DLMS 103-1 may configure, may implement, and/or may otherwise be communicatively coupled to nodes 201-1, 201-2, 201-3, and/or other nodes 201 that implement, maintain, etc. distributed ledgers 107 managed by DLMS 103-1 (e.g., distributed ledgers 107-1, 107-2, and 107-3). A respective set of nodes 201 that maintain a particular distributed ledger 107 may be referred to as a "channel." Additionally, or alternatively, the term "channel" may refer to or otherwise be associated with an association between a respective set of nodes 201 and the particular distributed ledger 107 maintained by such nodes 201. In this example, nodes 201-1, 201-2, and 201-3 may maintain distributed ledger 107-1, and may accordingly be associated with a first channel ("Channel_A"). Similarly, another set of nodes 201, managed by DLMS 103-1, may maintain distributed ledger 107-2 and may accordingly be associated with a second channel ("Channel_B"), and yet another set of nodes 201 managed by DLMS 103-1 may maintain distributed ledger 107-3 and may accordingly be associated with a third channel ("Channel_C").

Nodes 201 may maintain local copies of a respective distributed ledger 107. For example, node 201-1 may maintain a respective local copy 107-1A of distributed ledger 107-1, node 201-2 may maintain a respective local copy 107-1B of distributed ledger 107-1, and node 201-3 may maintain a respective local copy 107-1C of distributed ledger 107-1. Nodes 201 of the same channel (e.g., maintaining the same distributed ledger 107) may communicate with each other in order to ensure that the respective local copies of such distributed ledger 107 are identical, thus preserving the integrity of such distributed ledger 107.

DLMS 103-1 may serve as ingress and/or point, router, etc. with respect to respective distributed ledgers 107 and/or associated channels. For example, DLMS 103-1 may receive information to be recorded to a particular distributed ledger 107, may identify one or more nodes 201 or channels associated with such distributed ledger 107, and may provide the information to such identified nodes 201 and/or channels. The identified nodes 201 may perform operations related to recording the information to the particular distributed ledger 107, such as cross-validating the information, cross-validating local copies of distributed ledger 107, etc. Similarly, DLMS 103-1 may provide access to authorized entities to view, access, etc. a given distributed ledger 107 (e.g., one or more distributed ledgers 107 may be "permissioned" distributed ledgers 107 that are only accessible by authorized entities), and may restrict access from unauthorized entities.

Returning to FIG. 1, the registration (at 102) of DLMAS 101 with DLMSs 103-1 and 103-2 may include establishing permissions for DLMAS 101 to access respective distributed ledgers 107 managed by DLMSs 103-1 and 103-2. Such permissions may include "view" permissions, "edit" permissions, and/or other suitable permissions. Edit permissions may include, for example, adding entries to respective distributed ledgers 107, adding distributed ledgers 107 to a particular DLMS 103, removing distributed ledgers 107 from a particular DLMS 103, or the like. Further, the registration of DLMAS 101 with DLMSs 103-1 and 103-2 may include the exchange or providing of authentication information, such as one or more keys, authentication tokens, passwords, or the like, which may be used by DLMSs 103-1 and 103-2 to authenticate DLMAS 101 (e.g., to authenticate requests, instructions, etc. from DLMAS 101).

As such, DLMSs 103 may maintain respective permissions, authorization information, authentication information, etc. for one or more devices or systems. DLMSs 103 may utilize such information to provide access to respective distributed ledgers 107 in accordance with permissions associated with different devices or systems. FIG. 3 illustrates example data structures 301 and 303 that may be maintained by DLMSs 103-1 and 103-2, respectively, that indicates such permissions and/or authorization information. As shown, for example, DLMS 103-1 may maintain data structure 301, indicating permissions associated with three example entities. Data structure 301 may include identifiers associated with such entities, such as an Internet Protocol ("IP") address, a device identifier, a user name, and/or other suitable identifiers. In FIG. 3, the entities are referred to as "Dev_A" and "Dev_B," in addition to DLMAS 101 shown in FIG. 1. As noted above, each entity may be associated with different permissions to access, edit, etc. respective distributed ledgers 107 managed by DLMS 103-1. The permissions may have been established during respective registrations of these entities with DLMS 103-1 and/or in some other suitable manner.

For example, DLMAS 101 may be associated with permissions to read distributed ledgers 107-1 and 107-2 (e.g., may be restricted from reading distributed ledger 107-3), and further may be associated with permissions to edit distributed ledger 107-1 (e.g., to delete distributed ledger 107-1, add records to distributed ledger 107-1, etc.). Additionally, Dev_A may have permissions to read distributed ledgers 107-2 and 107-3, and Dev_B may have permissions to read all distributed ledgers 107 managed by DLMS 103-1 and to add new distributed ledgers 107 to DLMS 103-1. As shown in data structure 303, DLMAS 101 may also have permission to read distributed ledger 107-5 managed by DLMS 103-2, and to add new distributed ledgers 107 to DLMS 103-2. Dev_A may have permissions to read distributed ledgers 107-4, 107-5, and 107-6, and Dev_C may have permissions to add new distributed ledgers 107 to DLMS 103-2.

Returning to FIG. 1, DLMAS 101 may also register (at 104) with DLC 105, which may include establishing permissions, authorization information, authentication information, etc. with DLC 105. For example, in some embodiments, DLMAS 101 may serve as an interface between DLC 105 and one or more distributed ledgers 107 managed by respective DLMSs 103. Additionally, or alternatively, in some embodiments, DLC 105 may access DLMSs 103 directly in order to access respective distributed ledgers 107 managed by such DLMSs 103. The permissions associated with DLC 105 may, in some embodiments, include a subset of the permissions associated with DLMAS 101 (e.g., permissions to access, edit, etc. distributed ledgers 107 of DLMSs 103) and/or may otherwise be derived from permissions associated with DLMAS 101.

Figure 4:
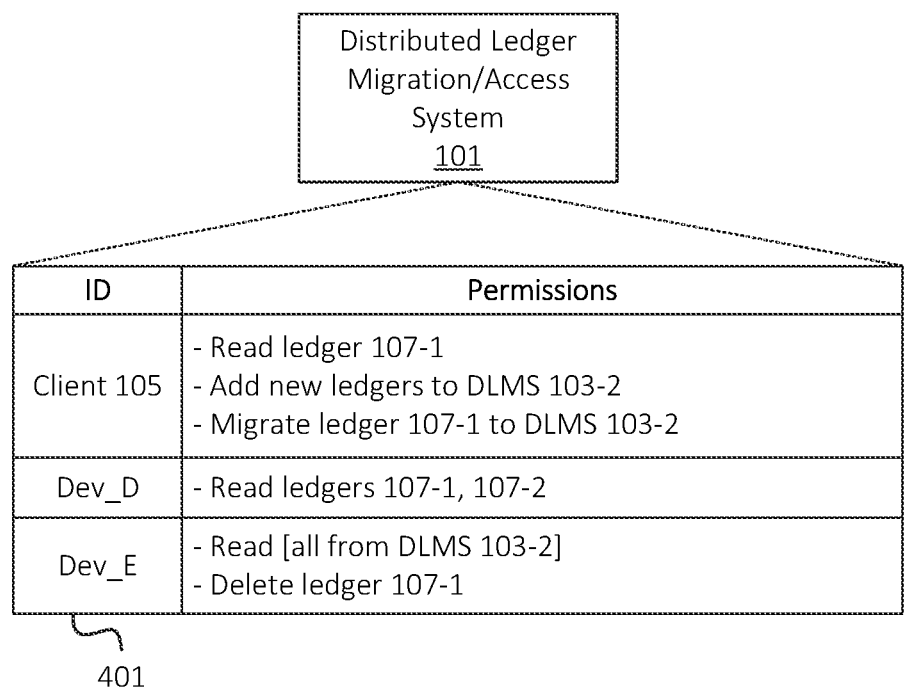

For example, as shown in FIG. 4, DLMAS 101 may maintain data structure 401, that indicates respective permissions associated with DLC 105 and/or one or more other entities, referred to as "Dev_D" and "Dev_E." DLC 105 may have permissions to read distributed ledger 107-1, add new ledgers to DLMS 103-2, and to migrate distributed ledger 107-1 (e.g., as managed by DLMS 103-1) to DLMS 103-2. Referring to data structures 301 and 303, and as noted above, the permissions associated with DLC 105 (e.g., with respect to DLMSs 103-1 and 103-2 and/or distributed ledgers 107 managed by the same) may be a subset of and/or may otherwise be based on permissions of DLMAS 101 to access DLMSs 103-1 and 103-2. For example, since DLMAS 101 is authorized to read ledger 107-1 (e.g., as reflected in data structure 301) and is further authorized to add new distributed ledgers 107 to DLMS 103-2 (e.g., as reflected in data structure 303), DLMAS 101 may offer the option for other entities (e.g., DLC 105) to perform the same operations. For example, DLMAS 101 may offer such options via a graphical user interface ("GUI"), a web portal, an API, or other suitable communication pathway between other devices or systems (e.g., DLC 105 and/or other devices or systems).

In some embodiments, the authorization for DLC 105 to migrate distributed ledger 107-1 to DLMS 103-2 may be determined automatically by DLMAS 101 based on the authorization of DLC 105 to read distributed ledger 107-1 (as managed by DLMS 103-1) and the authorization of DLC 105 to add new distributed ledgers 107 to DLMS 103-2. For example, as discussed below, the migration of a given distributed ledger 107 may include the reading of such distributed ledger 107 as well as the creation of a new corresponding distributed ledger 107 to be managed by another DLMS 103, or even the same DLMS 103. That is, while examples are discussed herein in the context of distributed ledgers 107 being migrated to a different DLMS 103, similar concepts may apply when migrating, copying, etc. distributed ledgers 107 to the same DLMS 103 (e.g., creating a new distributed ledger 107 to be managed by a given DLMS 103 based on an existing distributed ledger 107 that is already managed by the same DLMS 103).

As further shown, Dev_D may be associated with permissions to access to read distributed ledgers 107-1 and 107-2, managed by DLMS 103-1. Additionally, Dev_E may be associated with permissions to access all available distributed ledgers 107 managed by DLMS 103-2. That is, Dev_E may be authorized to access all distributed ledgers 107, managed by DLMS 103-2, that DLMAS 101 is authorized to access. In this example, referring to data structure 303, DLMAS 101 may have permissions to access distributed ledger 107-5 from DLMS 103-2. Thus, the authorization for Dev_E to access "all" distributed ledgers 107 from DLMS 103-2 may, in this scenario, include authorization to access distributed ledger 107-5. In situations where the authorization of DLMAS 101 changes, to access additional distributed ledgers 107 from DLMS 103-2, Dev_E may inherit the expanded authorization provided to DLMAS 101, and may also be authorized to access the additional distributed ledgers 107 from DLMS 103-2. As further shown, Dev_E may also have access to delete distributed ledger 107-1 from DLMS 103-1.

Figure 5:
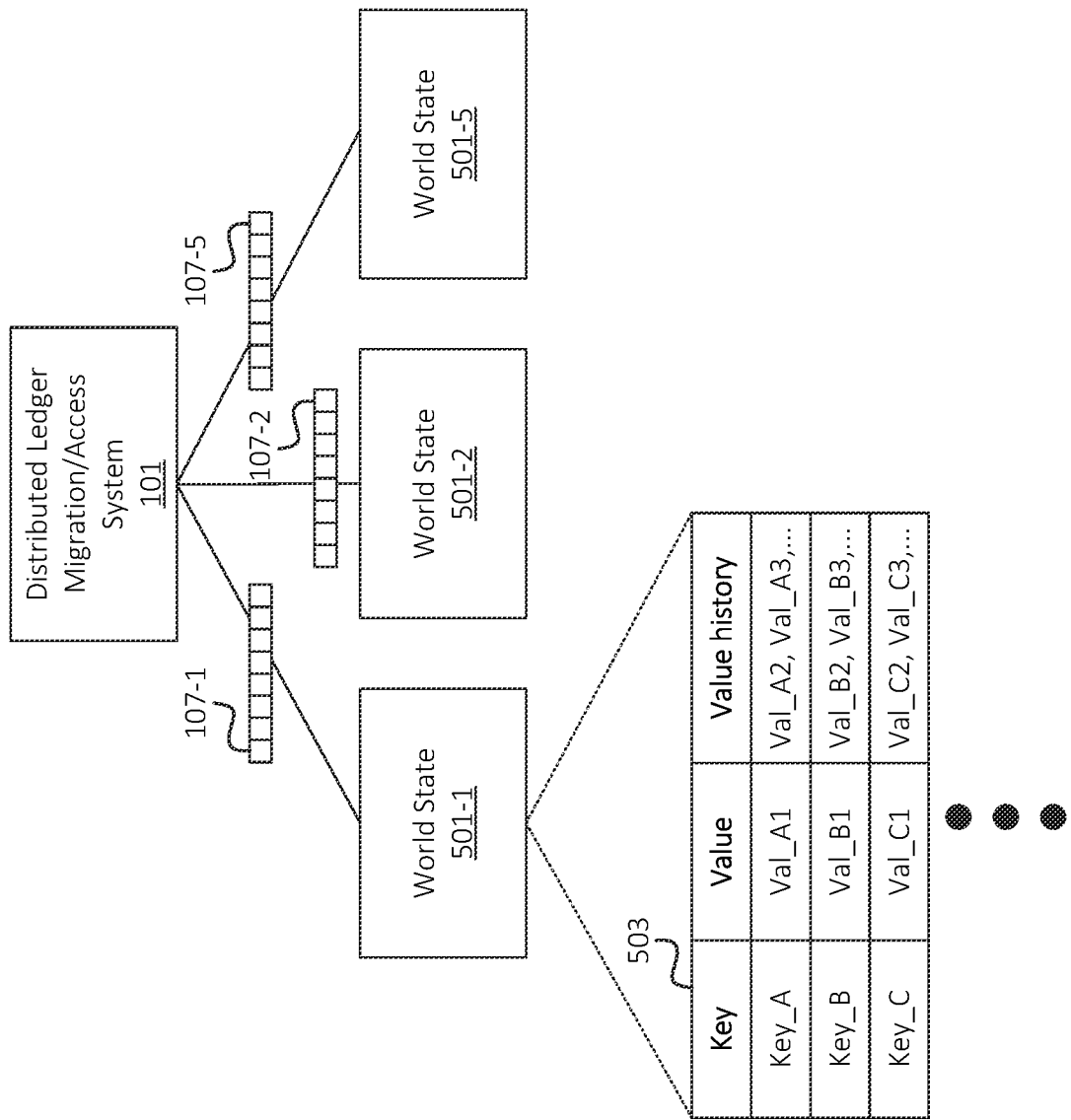
FIG. 5 illustrates an example of world state information associated with one or more distributed ledgers, in accordance with some embodiments.

As shown in FIG. 5, DLMAS 101 may further maintain world state information 501 associated with respective distributed ledgers 107 to which DLMAS 101 has access (e.g., read permissions). World state information 501 may include and/or may be implemented by a database or other type of data structure that includes information derived from respective distributed ledgers 107. For example, world state information 501-1 may be based on distributed ledger 107-1, world state information 501-2 may be based on distributed ledger 107-2, and world state information 501-5 may be based on distributed ledger 107-5. That is, referring to data structures 301 and 303, DLMAS 101 may, in some embodiments, maintain a respective world state information 501 for each distributed ledger 107 that DLMAS 101 is authorized to access.

World state information 501 may include and/or may be arranged as a set of keys and values, or in some other suitable arrangement. Generally, a "key" may refer to a variable, object, etc. for which a value may change over time. As one example, a key may refer to a sensor (e.g., associated with an Internet of Things ("IoT") device) that collects or measures data such as temperature readings, motion readings, etc., and values associated with such collected or measured data (e.g., temperatures, sensed motion, etc.). In some embodiments, the values may include or maybe associated with timestamps, metadata, etc. World state information 501, for a given set of keys, may indicate the latest, current, most up-to-date, and/or otherwise valid values of such keys. In some embodiments, world state information 501 may be derived from multiple values, such as an average, median, or other computed or derived value based on multiple values of a given key. Distributed ledgers 107 may include, for example, multiple records that each include a key identifier or other suitable information based on which a respective key is indicated, where each record includes one or more values for such key.

Data structure 503 may be an example arrangement of world state information 501-1, in some embodiments. As shown, data structure 503 may include values for respective keys, represented as "Key_A," "Key_B," "Key_C," etc. As indicated in data structure 503, a current, valid, etc. value for Key_A may be represented as "Val_A1," a current value for Key_B may be represented as "Val_B1," and a current value for Key_C may be represented as "Val_C1." In some embodiments, data structure 503 may include a history of values for one or more keys, such as values that have been superseded, deprecated, etc. by the current value. For example, the value history of Key_A may include previous values Val_A2, Val_A3, and so on. In some embodiments, world state information 501 may omit a value history, and may only include a current value for each key. World state information 501-2 and 501-5, as generated or maintained by DLMAS 101, may accordingly include similar arrangements as data structure 503 or some other suitable arrangement.

Returning to FIG. 1, DLMAS 101 may present (at 106) options to access, edit, and/or migrate distributed ledgers 107 for which DLC 105 is authorized to perform such operations. DLMAS 101 may present such options via an API, a web portal, an application, etc. As noted above, DLMAS 101 may provide some or all of the information included in respective distributed ledgers 107 that DLC 105 is authorized to access, may receive instructions to record information to respective distributed ledgers 107 to which DLC 105 is authorized to edit, etc. When providing information associated with respective distributed ledgers 107, in some embodiments, DLMAS 101 may utilize world state information 501 associated with such distributed ledgers 107 in order to provide the information associated with such distributed ledgers 107 to DLMAS 101. Additionally, or alternatively, DLMAS 101 may communicate with a respective DLMS 103 to obtain requested information associated with a given distributed ledger 107 in order to provide such information to DLC 105. As noted above, the authorized operations may include migrating a respective distributed ledger 107, maintained by a first DLMS 103, to a second DLMS 103.

Figure 6:
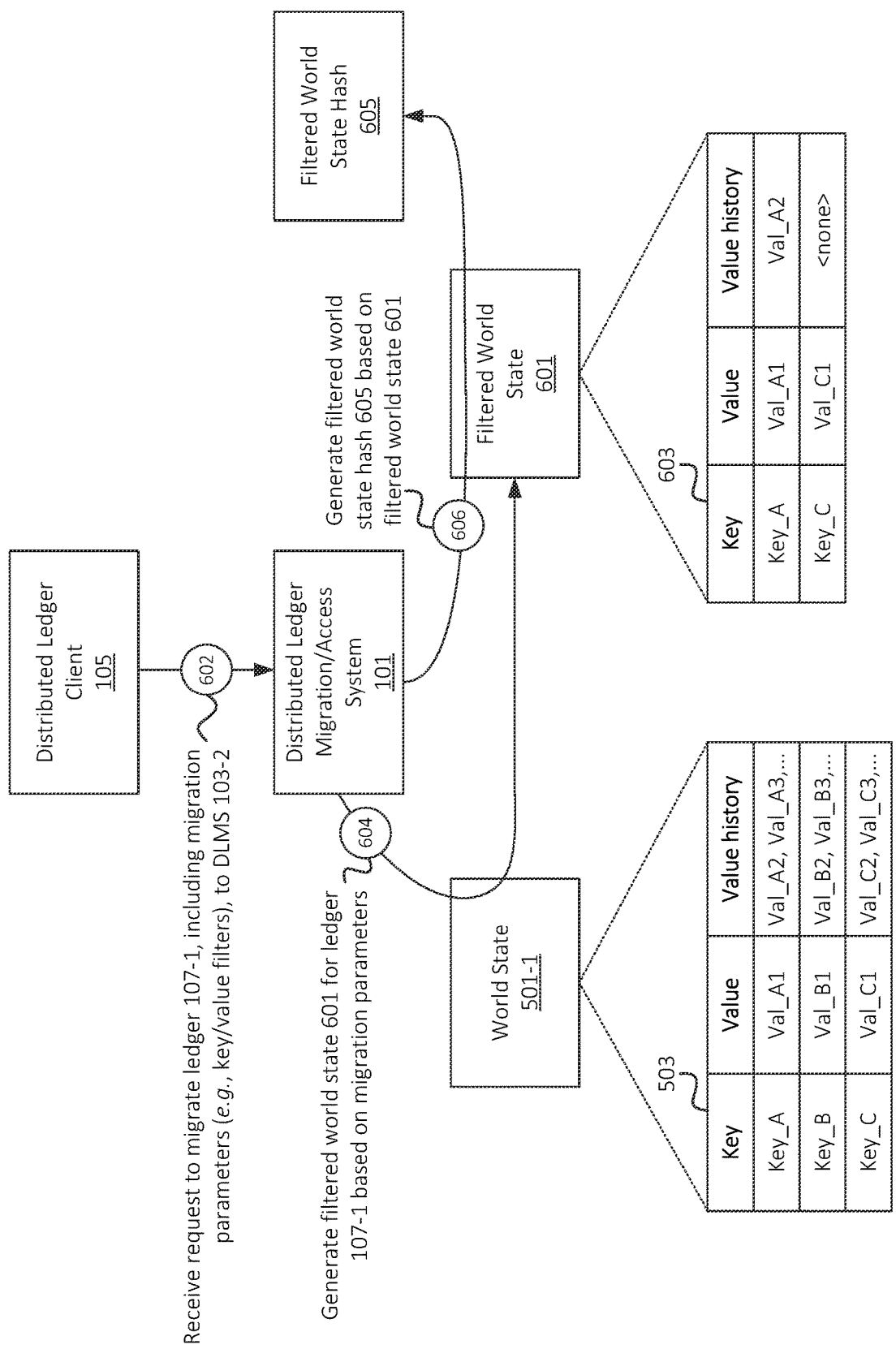
FIG. 6 illustrates an example of generating filtered world state information, in accordance with some embodiments.

As shown in FIG. 6, DLMAS 101 may receive (at 602) a request to migrate a particular distributed ledger 107 (i.e., distributed ledger 107-1, in this example) to DLMS 103-2. The request may include, for example, a selection via a GUI of a selectable option that indicates DLMS 103-2, may include an identifier of DLMS 103-2, may include criteria or specifications based on which DLMAS 101 may select DLMS 103-2 for the migration, and/or may otherwise indicate that DLMS 103-2 is a target for the migration of distributed ledger 107-1. In some embodiments, the request may include a set of migration parameters, which may include filters or other parameters based on which some or all of the information of distributed ledger 107-1 may be migrated. For example, DLC 105 may specify particular keys to be included in the migration, particular keys to be excluded or filtered from the migration, criteria of values to be included or excluded from the migration (e.g., values with a timestamp that is older than a threshold age, only the two most recent values for a given key, etc.), and/or other suitable parameters or criteria. In some embodiments, the migration parameters may include node parameters, such as quantity of nodes associated with DLMS 103-2 to maintain the migrated distributed ledger 107-1, node resource attributes (e.g., processor type, storage capacity, Service Level Agreement ("SLAs"), and/or other hardware or resource attributes), and/or other suitable parameters.

Based on the received migration parameters, DLMAS 101 may generate (at 604) filtered world state information 601. Data structure 603 illustrates an example arrangement of filtered world state information 601. As shown, data structure 603 may include a subset of the information included in data structure 503, which is associated with world state information 501-1 of distributed ledger 107-1. The subset may be based on filters or other criteria specified in the request (at 602). For example, Key_B may be excluded from filtered world state information 601 based on the filters, and one or more historical values of Key_A and Key_C may be omitted from filtered world state information 601. For example, based on the filters, historical value Val_A2 for Key_A may be retained, but other historical values for Key_A may be excluded. As further shown, based on the filters, all historical values for Key_C may be excluded from filtered world state information 601.

DLMAS 101 may further generate (at 606) verification data associated with filtered world state information 601, such as filtered world state hash 605. Filtered world state hash 605 may be, may include, etc. a cryptographic hash of filtered world state information 601 (e.g., of data structure 603 and/or information stored therein) and/or some other derivation of filtered world state information 601. Generally, filtered world state hash 605 may be represented by a smaller amount of data than filtered world state information 601 itself (e.g., a 128-bit value, a 256-bit value, etc., while data structure 603 may be several Megabytes or Gigabytes).

Figure 7:
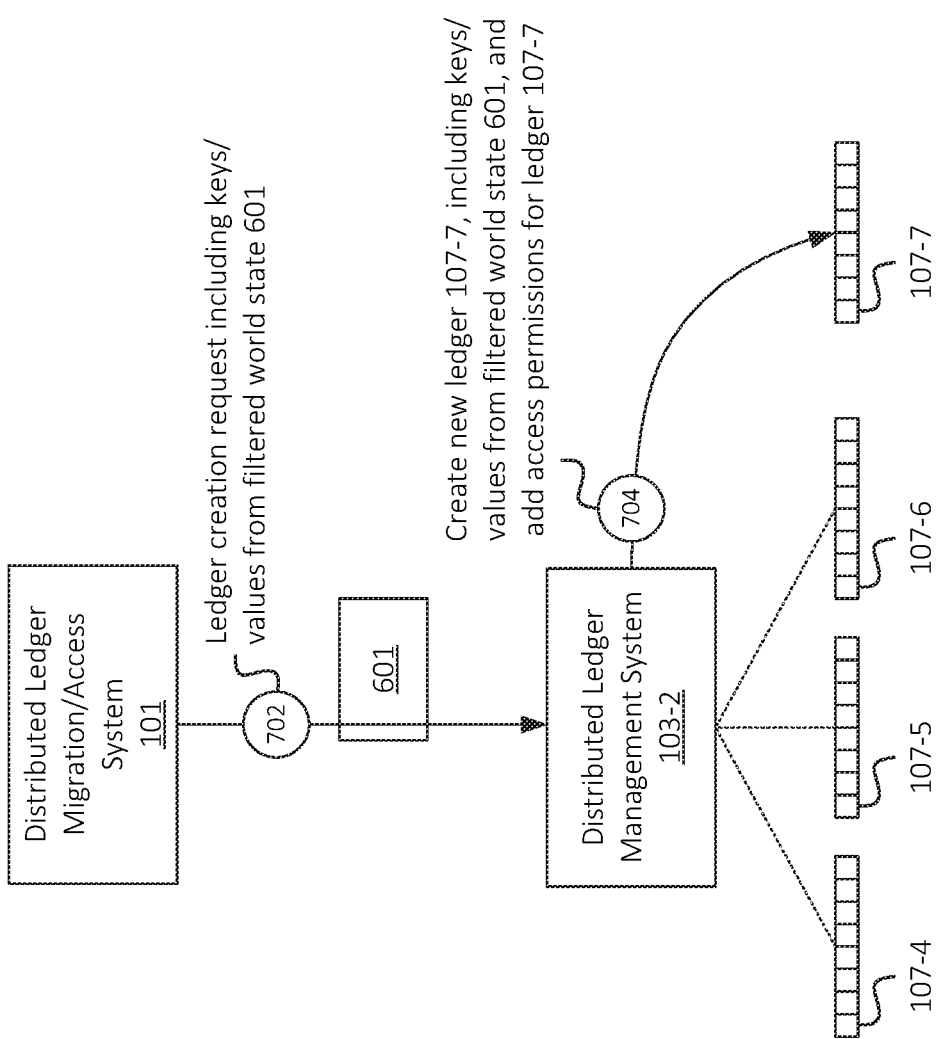
FIG. 7 illustrates an example of creating a distributed ledger based on filtered world state information, in accordance with some embodiments.

As shown in FIG. 7, DLMAS 101 may further output (at 702) a distributed ledger creation request to DLMS 103-2, based on the request (at 602) from DLC 105 to migrate distributed ledger 107-1 to DLMS 103-2. The ledger creation request (at 702) may include some or all of the migration parameters specified by DLC 105, such as quantity of nodes, node attributes, etc. In some embodiments, the ledger creation request may include filtered world state information 601 (e.g., keys, values, metadata, etc. included in data structure 603). In some embodiments, filtered world state information 601 may be organized and provided as multiple files, such as JavaScript Object Notation ("JSON") files or other suitable files, in order to ensure robust delivery of filtered world state information 601 to DLMS 103-2. DLMS 103-2 may authenticate the request from DLMAS 101 and/or may verify authorization of DLMAS 101 to request the creation of one or more distributed ledgers 107 (e.g., based on permissions indicated in data structure 303).

DLMS 103-2 may accordingly create (at 704) distributed ledger 107-7 based on the request (e.g., assuming that DLMS 103-2 has verified that DLMAS 101 is authorized to make the request), and may further record the information of filtered world state information 601 (e.g., the keys, values, etc. indicated in data structure 603) to the newly created distributed ledger 107-7. In some embodiments, creating distributed ledger 107-7 may include establishing a channel associated with distributed ledger 107-7, such as instantiating, provisioning, configuring, etc. one or more nodes 201 to maintain distributed ledger 107-7. In this manner, distributed ledger 107-7 may include filtered world state information 601 (e.g., values shown in data structure 603). In some scenarios, the request (at 602) to migrate distributed ledger 107-1 may omit filters, and in such scenarios distributed ledger 107-7 may include all of the information of world state information 501-1 (e.g., all keys, values, historical values, metadata, etc.) included in original distributed ledger 107-1.

Figure 8:
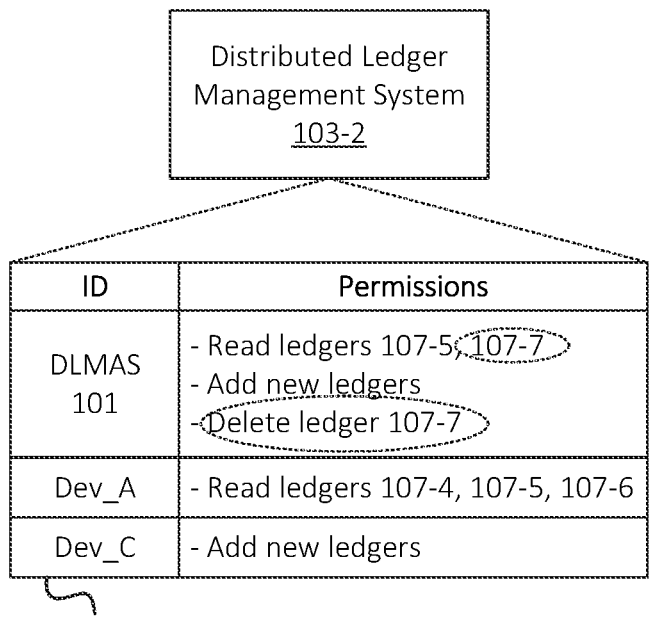
FIGS. 8 and 9 illustrate examples of modified permission information, in accordance with some embodiments.
Figure 9:
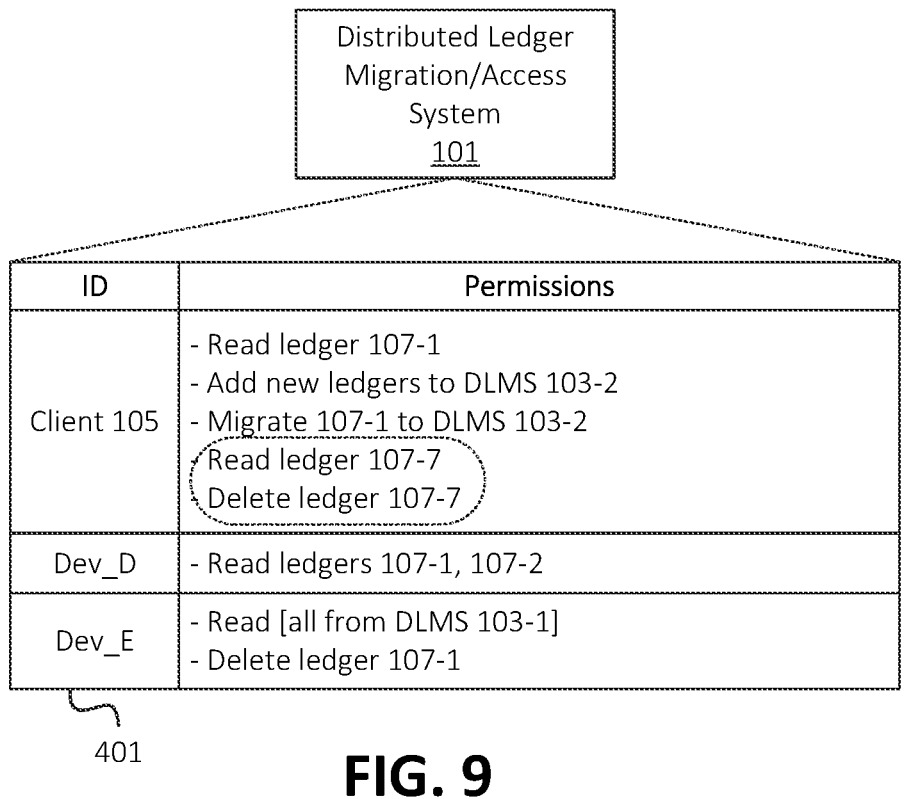

DLMS 103-2 may further add (at 704) permissions associated with distributed ledger 107-7. For example, as shown in FIG. 8, DLMS 103-2 may modify data structure 303 to reflect that DLMAS 101 is authorized to read and/or delete newly created distributed ledger 107-7. Similarly, as shown in FIG. 9, DLMAS 101 may modify data structure 401 to reflect that DLC 105, from which the request was received, is authorized to read and/or delete newly created distributed ledger 107-7. For example, DLMAS 101 may make such modification based on identifying that DLC 105 is an originator of the request to create distributed ledger 107-7 (e.g., based on migrating distributed ledger 107-1), and is therefore authorized to read and/or delete distributed ledger 107-7. Additionally, or alternatively, in some embodiments, DLMAS 101 may not automatically associate DLC 105 with permissions to delete distributed ledger 107-7, even though DLC 105 requested the creation of distributed ledger 107-7.

In some embodiments, DLMAS 101 may provide information indicating some or all of the permissions associated with a given DLMS 103 to the given DLMS 103. In this manner, DLMS 103 may inherit permission information granting access to DLC 105 and/or other entities. For example, DLMAS 101 may identify that one or more permissions maintained by DLMAS 101 (e.g., in data structure 401) are associated with DLMS 103-2, such as the information indicating that DLC 105 is authorized to add new distributed ledgers 107 to DLMS 103-2, that DLC 105 is authorized to read distributed ledger 107-7, and that DLC 105 is authorized to delete distributed ledger 107-7. DLMAS 101 may provide such information to DLMS 103-2, such that DLMS 103-2 may provide access to DLC 105 in accordance with such permissions. For example, based on the permissions, DLC 105 may communicate directly with DLMS 103-2 (e.g., to read distributed ledger 107-7, delete distributed ledger 107-7, etc.).

In some embodiments, DLMAS 101 may verify that distributed ledger 107-7 matches the migrated distributed ledger 107-1, and/or the portion of distributed ledger 107-1 that was requested to be migrated. For example, in situations where the migration request specified one or more filters, criteria, etc., the verification may include verifying that the keys, values, value history, etc. associated with filtered world state hash 605 have been recorded to distributed ledger 107-7. In situations where the migration request did not specify filters, and/or otherwise specified a full migration of distributed ledger 107-1, DLMAS 101 may verify that all keys, values, value history, etc. associated with original world state information 501-1 have been recorded to distributed ledger 107-7.

Figure 10:
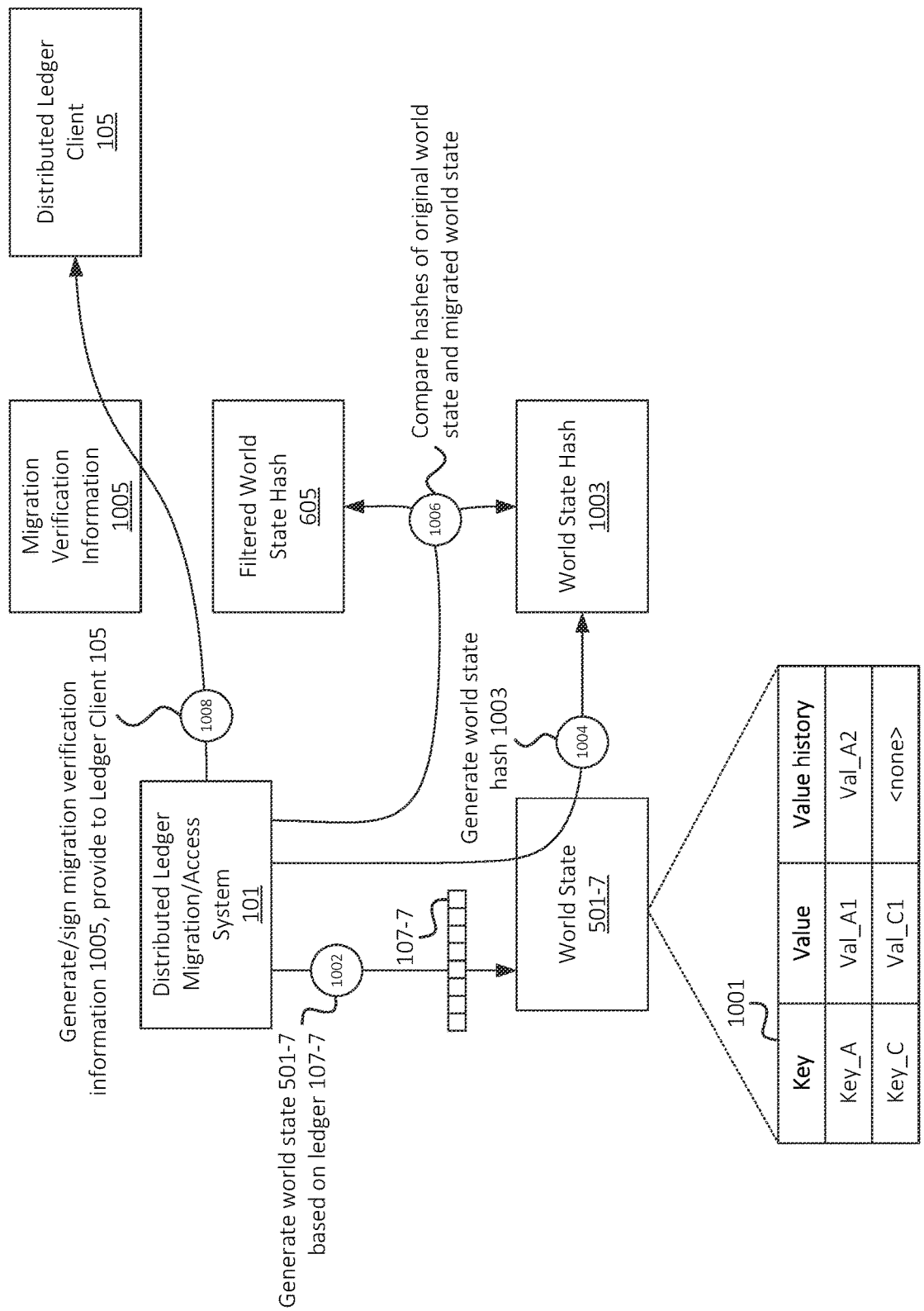
FIG. 10 illustrates an example verification procedure for a migrated distributed ledger, in accordance with some embodiments.

As shown in FIG. 10, for example, DLMAS 101 may generate (at 1002) world state information 501-7 based on distributed ledger 107-7. As similarly described above, generating world state information 501-7 may include identifying keys, values, value history, metadata, etc. recorded to distributed ledger 107-7. Such identified information may be reflected in data structure 1001 or other suitable type of representation. In some embodiments, DLMAS 101 may further generate (at 1004) world state hash 1003 based on world state information 501-7. DLMAS 101 may utilize the same techniques (e.g., the same cryptographic hashing techniques or other suitable computations) as used (at 606) to generate filtered world state hash 605. Thus, world state hash 1003 may use the same format, quantity of bits, etc. to represent world state information 501-7 (e.g., the information reflected in data structure 1001) as used to represent filtered world state information 601 (e.g., the information reflected in data structure 603). DLMAS 101 may further compare (at 1006) world state hash 1003 to filtered world state hash 605. For example, DLMAS 101 may perform a bitwise comparison or other suitable similarity analysis to determine whether world state hash 1003 matches filtered world state hash 605 (e.g., an exact match, or other suitable type of match).

World state hash 1003 may match filtered world state hash 605 when the underlying data based on which world state hash 1003 and filtered world state hash 605 were computed (e.g., world state information 501-7 and filtered world state information 601, respectively) matches. That is, world state hash 1003 may match filtered world state hash 605 when all of the keys, values, etc. of filtered world state information 601 (e.g., of original distributed ledger 107-1) have been recorded to distributed ledger 107-7 (e.g., migrated to DLMS 103-2). Assuming DLMAS 101 has determined, based on the comparing (at 1006), that world state hash 1003 matches filtered world state hash 605, DLMAS 101 may generate (at 1008) migration verification information 1005. Migration verification information 1005 may include, for example, a digital signature or other type of secure mechanism that indicates that DLMAS 101 is certifying, guaranteeing, etc. that DLMAS 101 has determined that world state hash 1003 and 605 match, and therefore that distributed ledger 107-1 has been migrated to DLMS 103-2 in accordance with the requested migration parameters.

In some embodiments, in situations where the requested migration parameters include node parameters such as quantity of nodes, node attributes, etc., DLMAS 101 may communicate with DLMS 103-2 to determine whether such parameters have been implemented. For example, DLMAS 101 may query DLMS 103-2 and/or otherwise request information indicating parameters of nodes 201 that maintain ledger 107-7, and may compare such parameters to the requested node parameters. In such embodiments, migration verification information 1005 may reflect that DLMAS 101 has verified that the node parameters of such nodes 201 match the requested node parameters.

Figure 11:
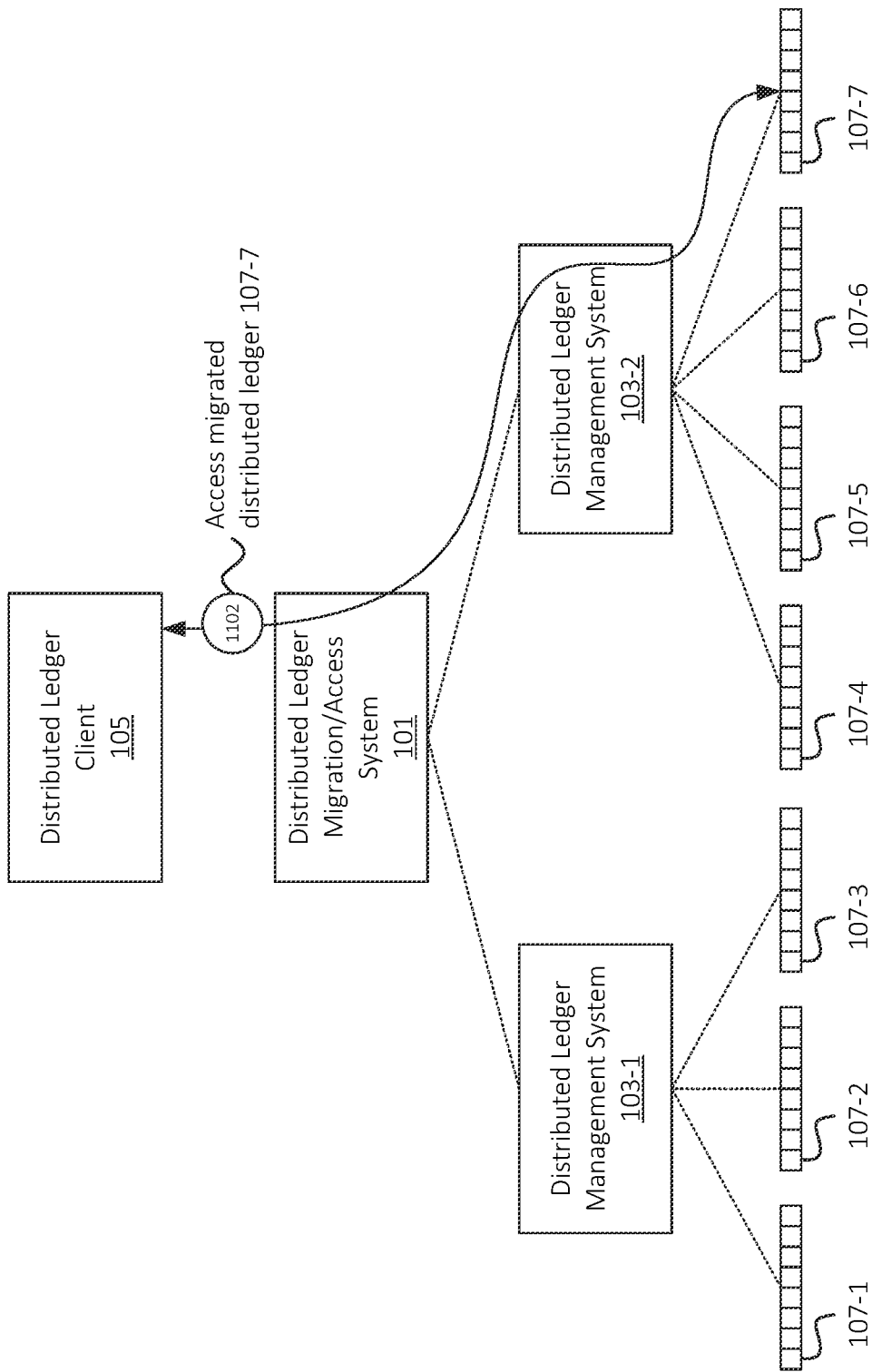
FIG. 11 illustrates an example of a client accessing a migrated dl, in accordance with some embodiments.

DLMAS 101 may further provide (at 1008) migration verification information 1005 to DLC 105. Receiving migration verification information 1005 may indicate, to DLC 105 and/or a user thereof, that the migration request has been fulfilled in accordance with any applicable migration parameters. Based on the operations described above, and as shown in FIG. 11, DLC 105 may be able to access (at 1102) the migrated distributed ledger 107-7. For example, DLMAS 101 may serve as an interface between DLC 105 and DLMS 103-2, which maintains distributed ledger 107-7. DLMAS 101 may, for example, route requests to modify (e.g., record new information to) distributed ledger 107-7 to DLMS 103-2. Additionally, DLMAS 101 may provide information (e.g., world state information and/or raw records of distributed ledger 107-7) to DLC 105.

As discussed above, DLMAS 101 may maintain permission information indicating that DLC 105 is authorized to view, edit, etc. distributed ledger 107-7, and may forward communications to DLMS 103-2 in accordance with such permissions. Similarly, DLMS 103-2 may maintain permission information indicating that DLMAS 101 is authorized to view, edit, etc. distributed ledger 107-7, and may perform suitable operations in accordance with such permissions. Additionally, or alternatively, as discussed above, DLMS 103-2 may maintain information indicating that DLC 105 is authorized to view, access, etc. distributed ledger 107-7, and may provide such access to DLC 105 in accordance with such permissions.

In some embodiments, based on migrating distributed ledger 107-1 to DLMS 103-2, DLMAS 101 may initiate a deletion of distributed ledger 107-1 from DLMS 103-1, which may free up resources used by nodes 201 associated with DLMS 103-1 which were used to maintain distributed ledger 107-1. On the other hand, in some embodiments, DLMAS 101 may forgo initiating a deletion of distributed ledger 107-1 after migration, which may serve as a historical record or archive of the existence of distributed ledger 107-1 and/or the records maintained therein. In some embodiments, DLMAS 101 may provide a link, locator information, a pointer, a hash, an identifier, or other information to DLMS 103-1, indicating that distributed ledger 107-1 has been migrated to DLMS 103-2. The provided information may include an identifier, a hash, or other information associated with distributed ledger 107-7 and/or DLMS 103-2. DLMS 103-1 may maintain the received information, and/or may record the information to distributed ledger 107-1. In this manner, entities that are able to access distributed ledger 107-1 (e.g., DLC 105 and/or other devices or systems) may be able to ascertain, based on information recorded to distributed ledger 107-1, that distributed ledger 107-1 has been migrated to DLMS 103-2, and that distributed ledger 107-7 as maintained by DLMS 103-2 corresponds to distributed ledger 107-1.

Figure 12:
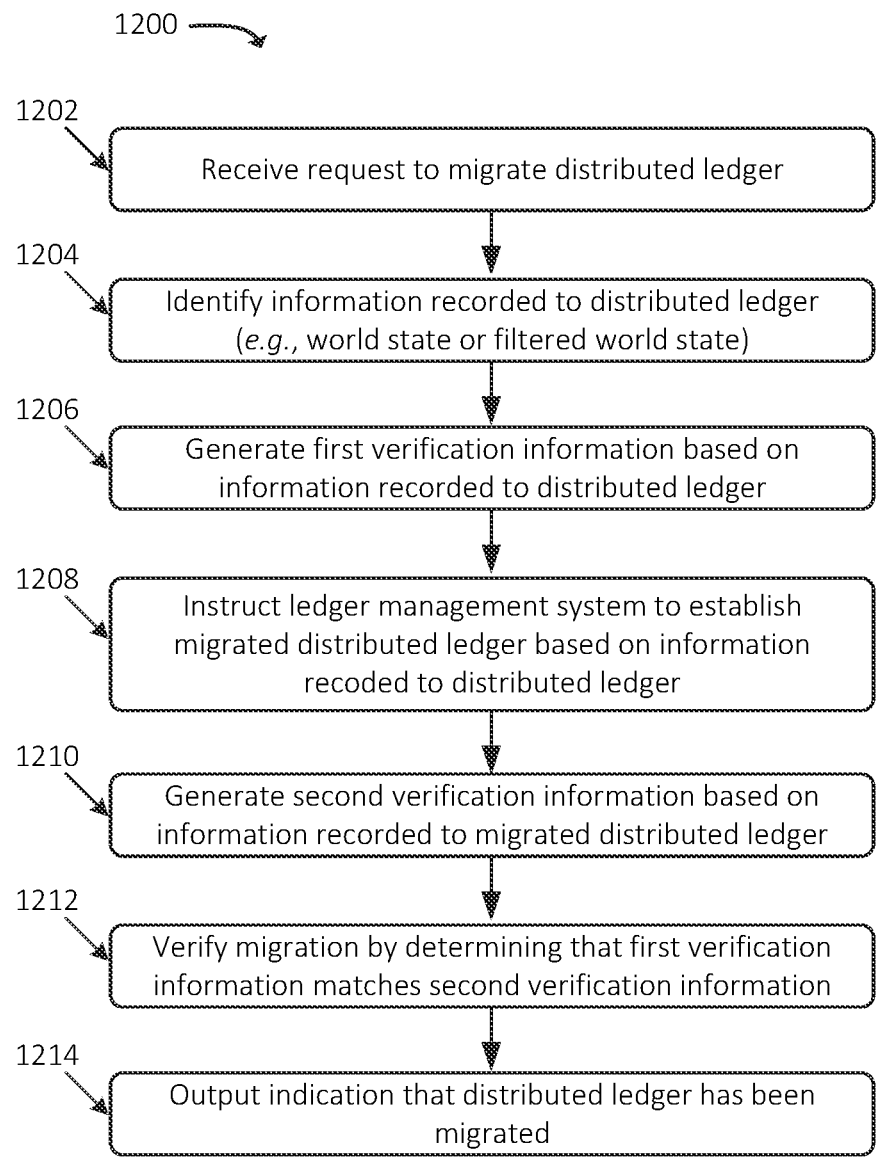
FIG. 12 illustrates an example process for performing a distributed ledger migration in accordance with some embodiments.

FIG. 12 illustrates an example process 1200 for performing a distributed ledger migration in accordance with some embodiments. In some embodiments, some or all of process 1200 may be performed by DLMAS 101. In some embodiments, one or more other devices (e.g., one or more DLMSs 103) may perform some or all of process 1200 in concert with, and/or in lieu of, DLMAS 101.

As shown, process 1200 may include receiving (at 1202) a request to migrate a particular distributed ledger 107 (also referred to as "original" distributed ledger 107). For example, DLMAS 101 may receive a request (e.g., from DLC 105 and/or some other source) to migrate a particular distributed ledger 107, which may be maintained by a particular set of nodes 201 (e.g., nodes 201 associated with a first DLMS 103). Distributed ledger 107 may be a "permissioned" distributed ledger 107 for DLMAS 101 retains permissions to access (e.g., read) distributed ledger 107. Additionally, or alternatively, distributed ledger 107 may be a "public" distributed ledger 107 that is available for access (e.g., read access) to any device or system. The request may indicate another set of nodes 201 to which distributed ledger 107, may specify a particular DLMS 103 (e.g., associated with a particular distributed ledger framework, which may be different from a framework or protocol currently associated with distributed ledger 107), and/or may otherwise specify a destination or host for the migration of distributed ledger 107.

Process 1200 may further include identifying (at 1204) information recorded to distributed ledger 107, such as world state information 501 associated with the first distributed ledger 107. As discussed above, world state information 501 may include a set of keys and one or more values for each key of the set of keys. In some embodiments, world state information 501 may include all values (e.g., historical values) for all keys, as recorded to distributed ledger 107. In some embodiments, world state information 501 may include a subset of values for some or all keys recorded to distributed ledger 107 (e.g., the latest value for each key and/or otherwise fewer than all historical values for each key). In some embodiments, the request (at 1202) may include a set of filters, criteria, etc. based on which DLMAS 101 may identify a subset of information recorded to distributed ledger 107, and may accordingly generate filtered world state information 601, as discussed above.

Process 1200 may additionally include generating (at 1206) first verification information based on the information recorded to distributed ledger 107. For example, DLMAS 101 may utilize a cryptographic hashing function or perform some other suitable operation, using the information recorded to the original distributed ledger 107 (e.g., world state information 501, filtered world state information 601, etc.) as an input. In other words, for instance, DLMAS 101 may "generate a hash" of the original distributed ledger 107 and/or of some or all of the information recorded thereto (e.g., world state information 501, filtered world state information 601, etc.).

Process 1200 may also include instructing (at 1208) a particular DLMS 103 (e.g., as indicated in the request) to establish migrated distributed ledger 107 based on the information recorded to original distributed ledger 107. For example, DLMAS 101 may have previously registered with DLMS 103 (which may be a different DLMS 103 from a DLMS 103 that maintains original distributed ledger 107, or may be the same DLMS 103), such that DLMAS 101 has permissions or authorization to request the creation of one or more distributed ledgers to be maintained by the particular DLMS 103. DLMAS 101 may provide the information, recorded to the original distributed ledger 107, to the particular DLMS 103 for recordation to migrated distributed ledger 107. For example, DLMAS 101 may provide keys and/or values included in world state information 501, filtered world state information 601, etc., based on parameters specified in the request.

Process 1200 may further include generating (at 1210) second verification information based on the information recorded to migrated distributed ledger 107. DLMAS 101 may, for example, utilize a cryptographic hashing operation or other suitable operation, using the information recorded to migrated distributed ledger 107 as input. In some embodiments, DLMAS 101 may access migrated distributed ledger 107 via the particular DLMS 103 and/or via some other suitable communication pathway. The second verification information may be generated in the same manner as the first verification information, which may include using the same cryptographic hashing operation or other suitable operation. In some embodiments, DLMAS 101 may format, normalize, etc. the information accessed from migrated distributed ledger 107, which may include generating world state information for migrated distributed ledger 107 using a same format, schema, etc. as used for world state information 501 or filtered world state information 601 of original distributed ledger 107.

Process 1200 may additionally include verifying (at 1212) the migration of original distributed ledger 107 by determining that the first verification information matches the second verification information. DLMAS 101 may, for instance, compare the first verification information (e.g., a hash or other derivation of information accessed from original distributed ledger 107) to the second information (e.g., a hash or other derivation of information accessed from migrated distributed ledger 107) to verify whether the respective verification information for both the original and migrated distributed ledgers 107 match. The match may be determined based on an exact match or other suitable similarity analysis.

Process 1200 may also include outputting (at 1214) an indication that original distributed ledger 107 has been migrated, as per the request. For example, DLMAS 101 may indicate, to a source from which the migration request was received (at 1202), that the migration has been completed and verified. Additionally, or alternatively, DLMAS 101 may record information to original distributed ledger 107, indicating that the migration has been completed and verified. The indication (e.g., as provided to the source of the request, as recorded to original distributed ledger 107, etc.) may include a pointer, link, hash, address, etc. that may be used to identify or access migrated distributed ledger 107. For example, the indication may include an identifier or other indicator of migrated distributed ledger 107, and/or of DLMAS 103 and/or of one or more nodes 201 that maintain migrated distributed ledger 107.

Figure 13:
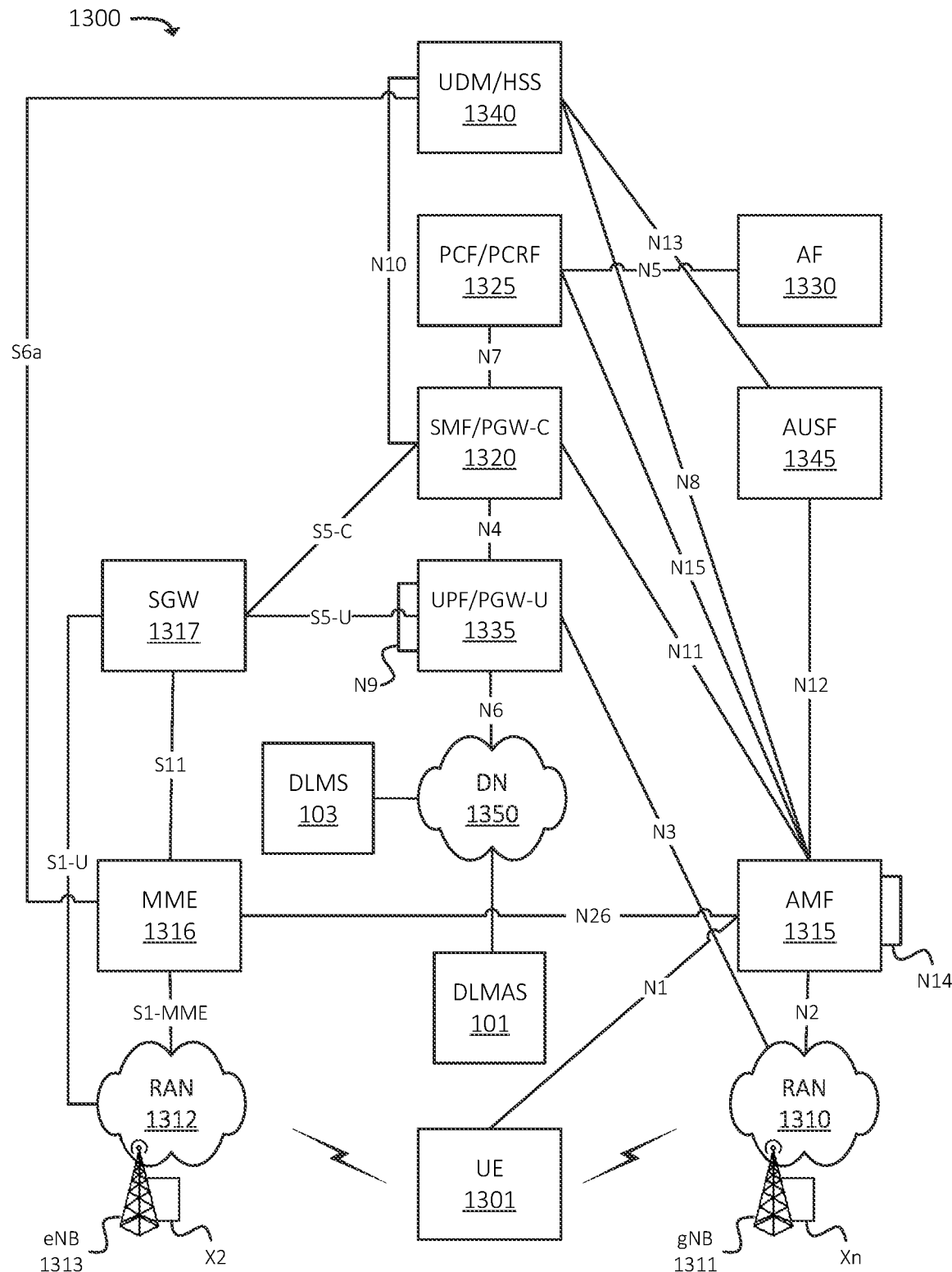
FIG. 13 illustrates an example environment in which one or more embodiments, described herein, may be implemented.

FIG. 13 illustrates an example environment 1300, in which one or more embodiments may be implemented. In some embodiments, environment 1300 may correspond to a Fifth Generation ("5G") network, and/or may include elements of a 5G network. In some embodiments, environment 1300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1300 may represent or may include a 5G core ("5GC"). As shown, environment 1300 may include UE 1301, RAN 1310 (which may include one or more Next Generation Node Bs ("gNBs") 1311), RAN 1312 (which may include one or more evolved Node Bs ("eNBs") 1313), and various network functions such as Access and Mobility Management Function ("AMF") 1315, Mobility Management Entity ("MME") 1316, Serving Gateway ("SGW") 1317, Session Management Function ("SMF")/Packet Data Network ("PDN") Gateway ("PGW")-Control plane function ("PGW-C") 1320, Policy Control Function ("PCF")/Policy Charging and Rules Function ("PCRF") 1325, Application Function ("AF") 1330, User Plane Function ("UPF")/PGW-User plane function ("PGW-U") 1335, Unified Data Management ("UDM")/Home Subscriber Server ("HSS") 1340, and Authentication Server Function ("AUSF") 1345. Environment 1300 may also include one or more networks, such as Data Network ("DN") 1350. Environment 1300 may include one or more additional devices or systems communicatively coupled to one or more networks (e.g., DN 1350), such as DLMAS 101.

The example shown in FIG. 13 illustrates one instance of each network component or function (e.g., one instance of SMF/PGW-C 1320, PCF/PCRF 1325, UPF/PGW-U 1335, UDM/HSS 1340, and/or AUSF 1345). In practice, environment 1300 may include multiple instances of such components or functions. For example, in some embodiments, environment 1300 may include multiple "slices" of a core network, where each slice includes a discrete and/or logical set of network functions (e.g., one slice may include a first instance of SMF/PGW-C 1320, PCF/PCRF 1325, UPF/PGW-U 1335, UDM/HSS 1340, and/or AUSF 1345, while another slice may include a second instance of SMF/PGW-C 1320, PCF/PCRF 1325, UPF/PGW-U 1335, UDM/HSS 1340, and/or AUSF 1345). The different slices may provide differentiated levels of service, such as service in accordance with different Quality of Service ("QoS") parameters.

The quantity of devices and/or networks, illustrated in FIG. 13, is provided for explanatory purposes only. In practice, environment 1300 may include additional devices and/or networks, fewer devices and/or networks, different devices and/or networks, or differently arranged devices and/or networks than illustrated in FIG. 13. For example, while not shown, environment 1300 may include devices that facilitate or enable communication between various components shown in environment 1300, such as routers, modems, gateways, switches, hubs, etc. In some implementations, one or more devices of environment 1300 may be physically integrated in, and/or may be physically attached to, one or more other devices of environment 1300. Alternatively, or additionally, one or more of the devices of environment 1300 may perform one or more network functions described as being performed by another one or more of the devices of environment 1300.

Elements of environment 1300 may interconnect with each other and/or other devices via wired connections, wireless connections, or a combination of wired and wireless connections. Examples of interfaces or communication pathways between the elements of environment 1300, as shown in FIG. 13, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 13, such as Service-Based Interfaces ("SBIs"), including an Namf interface, an Nudm interface, an Npcf interface, an Nupf interface, an Nnef interface, an Nsmf interface, and/or one or more other SBIs.

UE 1301 may include a computation and communication device, such as a wireless mobile communication device that is capable of communicating with RAN 1310, RAN 1312, and/or DN 1350. UE 1301 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1301 may send traffic to and/or receive traffic (e.g., user plane traffic) from DN 1350 via RAN 1310, RAN 1312, and/or UPF/PGW-U 1335. In some embodiments, UE 1301 may include, may implement, may be implemented by, may be communicatively coupled to, and/or may otherwise be associated with one or more nodes 201, DLMAS 101, and/or DLMS 103.

RAN 1310 may be, or may include, a 5G RAN that includes one or more base stations (e.g., one or more gNBs 1311), via which UE 1301 may communicate with one or more other elements of environment 1300. UE 1301 may communicate with RAN 1310 via an air interface (e.g., as provided by gNB 1311). For instance, RAN 1310 may receive traffic (e.g., user plane traffic such as voice call traffic, data traffic, messaging traffic, etc.) from UE 1301 via the air interface, and may communicate the traffic to UPF/PGW-U 1335 and/or one or more other devices or networks. Further, RAN 1310 may receive signaling traffic, control plane traffic, etc. from UE 1301 via the air interface, and may communicate such signaling traffic, control plane traffic, etc. to AMF 1315 and/or one or more other devices or networks. Additionally, RAN 1310 may receive traffic intended for UE 1301 (e.g., from UPF/PGW-U 1335, AMF 1315, and/or one or more other devices or networks) and may communicate the traffic to UE 1301 via the air interface.

RAN 1312 may be, or may include, a LTE RAN that includes one or more base stations (e.g., one or more eNBs 1313), via which UE 1301 may communicate with one or more other elements of environment 1300. UE 1301 may communicate with RAN 1312 via an air interface (e.g., as provided by eNB 1313). For instance, RAN 1312 may receive traffic (e.g., user plane traffic such as voice call traffic, data traffic, messaging traffic, signaling traffic, etc.) from UE 1301 via the air interface, and may communicate the traffic to UPF/PGW-U 1335 (e.g., via SGW 1317) and/or one or more other devices or networks. Further, RAN 1312 may receive signaling traffic, control plane traffic, etc. from UE 1301 via the air interface, and may communicate such signaling traffic, control plane traffic, etc. to MME 1316 and/or one or more other devices or networks. Additionally, RAN 1312 may receive traffic intended for UE 1301 (e.g., from UPF/PGW-U 1335, MME 1316, SGW 1317, and/or one or more other devices or networks) and may communicate the traffic to UE 1301 via the air interface.

AMF 1315 may include one or more devices, systems, Virtualized Network Functions ("VNFs"), Cloud-Native Network Functions ("CNFs"), etc., that perform operations to register UE 1301 with the 5G network, to establish bearer channels associated with a session with UE 1301, to hand off UE 1301 from the 5G network to another network, to hand off UE 1301 from the other network to the 5G network, manage mobility of UE 1301 between RANs 1310 and/or gNB s 1311, and/or to perform other operations. In some embodiments, the 5G network may include multiple AMFs 1315, which communicate with each other via the N14 interface (denoted in FIG. 13 by the line marked "N14" originating and terminating at AMF 1315).

MME 1316 may include one or more devices, systems, VNFs, CNFs, etc., that perform operations to register UE 1301 with the EPC, to establish bearer channels associated with a session with UE 1301, to hand off UE 1301 from the EPC to another network, to hand off UE 1301 from another network to the EPC, manage mobility of UE 1301 between RANs 1312 and/or eNBs 1313, and/or to perform other operations.

SGW 1317 may include one or more devices, systems, VNFs, CNFs, etc., that aggregate traffic received from one or more eNBs 1313 and send the aggregated traffic to an external network or device via UPF/PGW-U 1335. Additionally, SGW 1317 may aggregate traffic received from one or more UPF/PGW-Us 1335 and may send the aggregated traffic to one or more eNBs 1313. SGW 1317 may operate as an anchor for the user plane during inter-eNB handovers and as an anchor for mobility between different telecommunication networks or RANs (e.g., RANs 1310 and 1312).

SMF/PGW-C 1320 may include one or more devices, systems, VNFs, CNFs, etc., that gather, process, store, and/or provide information in a manner described herein. SMF/PGW-C 1320 may, for example, facilitate the establishment of communication sessions on behalf of UE 1301. In some embodiments, the establishment of communications sessions may be performed in accordance with one or more policies provided by PCF/PCRF 1325.

PCF/PCRF 1325 may include one or more devices, systems, VNFs, CNFs, etc., that aggregate information to and from the 5G network and/or other sources. PCF/PCRF 1325 may receive information regarding policies and/or subscriptions from one or more sources, such as subscriber databases and/or from one or more users (such as, for example, an administrator associated with PCF/PCRF 1325).

AF 1330 may include one or more devices, systems, VNFs, CNFs, etc., that receive, store, and/or provide information that may be used in determining parameters (e.g., quality of service parameters, charging parameters, or the like) for certain applications.

UPF/PGW-U 1335 may include one or more devices, systems, VNFs, CNFs, etc., that receive, store, and/or provide data (e.g., user plane data). For example, UPF/PGW-U 1335 may receive user plane data (e.g., voice call traffic, data traffic, etc.), destined for UE 1301, from DN 1350, and may forward the user plane data toward UE 1301 (e.g., via RAN 1310, SMF/PGW-C 1320, and/or one or more other devices). In some embodiments, multiple UPFs 1335 may be deployed (e.g., in different geographical locations), and the delivery of content to UE 1301 may be coordinated via the N9 interface (e.g., as denoted in FIG. 13 by the line marked "N9" originating and terminating at UPF/PGW-U 1335). Similarly, UPF/PGW-U 1335 may receive traffic from UE 1301 (e.g., via RAN 1310, RAN 1312, SMF/PGW-C 1320, and/or one or more other devices), and may forward the traffic toward DN 1350. In some embodiments, UPF/PGW-U 1335 may communicate (e.g., via the N4 interface) with SMF/PGW-C 1320, regarding user plane data processed by UPF/PGW-U 1335.

UDM/HSS 1340 and AUSF 1345 may include one or more devices, systems, VNFs, CNFs, etc., that manage, update, and/or store, in one or more memory devices associated with AUSF 1345 and/or UDM/HSS 1340, profile information associated with a subscriber. AUSF 1345 and/or UDM/HSS 1340 may perform authentication, authorization, and/or accounting operations associated with the subscriber and/or a communication session with UE 1301.

DN 1350 may include one or more wired and/or wireless networks. For example, DN 1350 may include an Internet Protocol ("IP")-based PDN, a wide area network ("WAN") such as the Internet, a private enterprise network, and/or one or more other networks. UE 1301 may communicate, through DN 1350, with data servers, other UEs 1301, and/or to other servers or applications that are coupled to DN 1350. DN 1350 may be connected to one or more other networks, such as a public switched telephone network ("PSTN"), a public land mobile network ("PLMN"), and/or another network. DN 1350 may be connected to one or more devices, such as content providers, applications, web servers, and/or other devices, with which UE 1301 may communicate.

Figure 14:
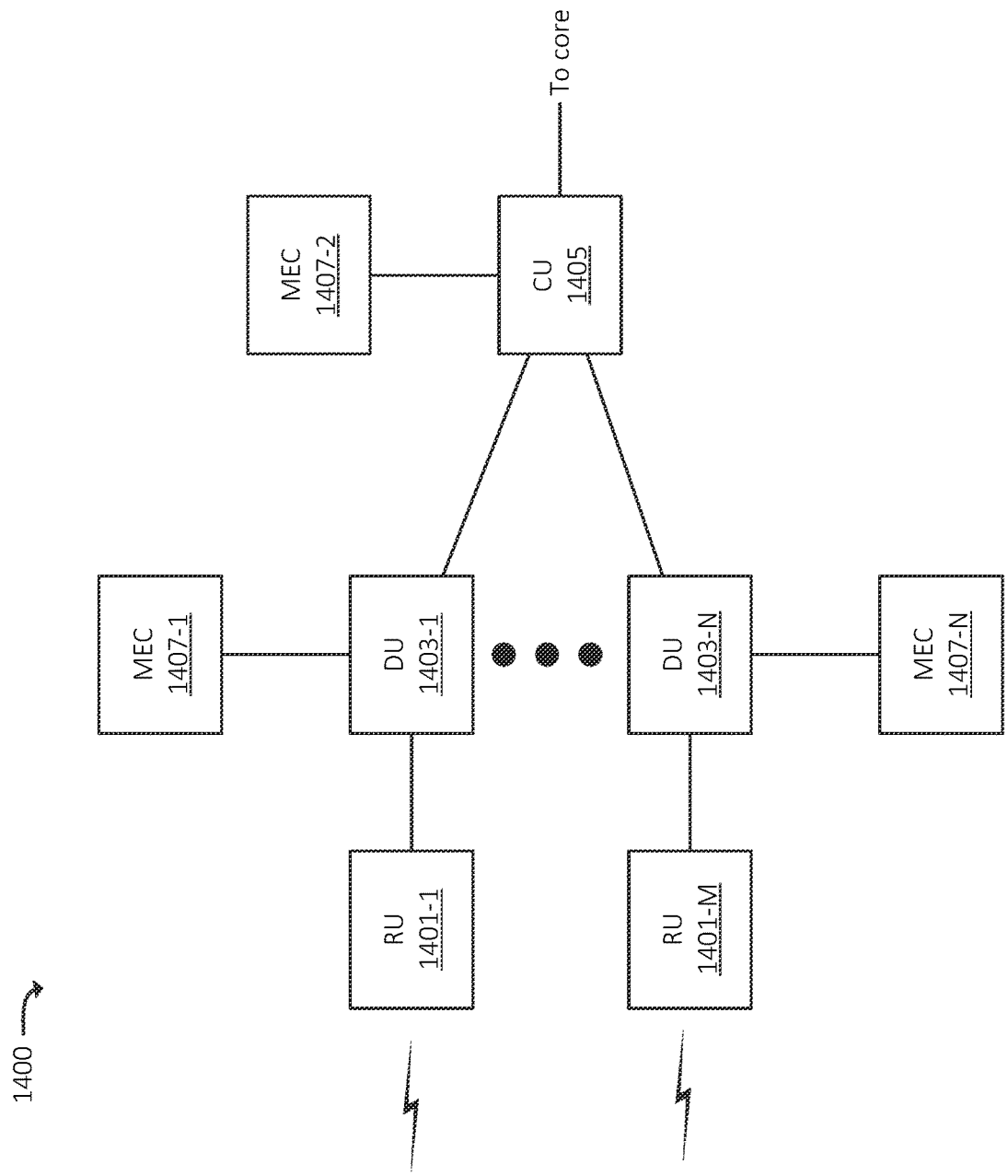
FIG. 14 illustrates an example arrangement of a radio access network ("RAN"), in accordance with some embodiments.

FIG. 14 illustrates an example RAN environment 1400, which may be included in and/or implemented by one or more RANs (e.g., RAN 1310, RAN 1312, or some other RAN). In some embodiments, a particular RAN may include one RAN environment 1400. In some embodiments, a particular RAN may include multiple RAN environments 1400. In some embodiments, RAN environment 1400 may correspond to a particular gNB 1311 of a 5G RAN (e.g., RAN 1310). In some embodiments, RAN environment 1400 may correspond to multiple gNBs 1311. In some embodiments, RAN environment 1400 may correspond to one or more other types of base stations of one or more other types of RANs. As shown, RAN environment 1400 may include Central Unit ("CU") 1405, one or more Distributed Units ("DUs") 1403-1 through 1403-N (referred to individually as "DU 1403," or collectively as "DUs 1403"), and one or more Radio Units ("RUs") 1401-1 through 1401-M (referred to individually as "RU 1401," or collectively as "RUs 1401").

CU 1405 may communicate with a core of a wireless network (e.g., may communicate with one or more of the devices or systems described above with respect to FIG. 13, such as AMF 1315 and/or UPF/PGW-U 1335). In the uplink direction (e.g., for traffic from UEs 1301 to a core network), CU 1405 may aggregate traffic from DUs 1403, and forward the aggregated traffic to the core network. In some embodiments, CU 1405 may receive traffic according to a given protocol (e.g., Radio Link Control ("RLC")) from DUs 1403, and may perform higher-layer processing (e.g., may aggregate/process RLC packets and generate Packet Data Convergence Protocol ("PDCP") packets based on the RLC packets) on the traffic received from DUs 1403.

In accordance with some embodiments, CU 1405 may receive downlink traffic (e.g., traffic from the core network) for a particular UE 1301, and may determine which DU(s) 1403 should receive the downlink traffic. DU 1403 may include one or more devices that transmit traffic between a core network (e.g., via CU 1405) and UE 1301 (e.g., via a respective RU 1401). DU 1403 may, for example, receive traffic from RU 1401 at a first layer (e.g., physical ("PHY") layer traffic, or lower PHY layer traffic), and may process/aggregate the traffic to a second layer (e.g., upper PHY and/or RLC). DU 1403 may receive traffic from CU 1405 at the second layer, may process the traffic to the first layer, and provide the processed traffic to a respective RU 1401 for transmission to UE 1301.

RU 1401 may include hardware circuitry (e.g., one or more RF transceivers, antennas, radios, and/or other suitable hardware) to communicate wirelessly (e.g., via an RF interface) with one or more UEs 1301, one or more other DUs 1403 (e.g., via RUs 1401 associated with DUs 1403), and/or any other suitable type of device. In the uplink direction, RU 1401 may receive traffic from UE 1301 and/or another DU 1403 via the RF interface and may provide the traffic to DU 1403. In the downlink direction, RU 1401 may receive traffic from DU 1403, and may provide the traffic to UE 1301 and/or another DU 1403.

One or more elements of RAN environment 1400 may, in some embodiments, be communicatively coupled to one or more Multi-Access/Mobile Edge Computing ("MEC") devices, referred to sometimes herein simply as "MECs" 1407. For example, DU 1403-1 may be communicatively coupled to MEC 1407-1, DU 1403-N may be communicatively coupled to MEC 1407-N, CU 1405 may be communicatively coupled to MEC 1407-2, and so on. MECs 1407 may include hardware resources (e.g., configurable or provisionable hardware resources) that may be configured to provide services and/or otherwise process traffic to and/or from UE 1301, via a respective RU 1401.

For example, DU 1403-1 may route some traffic, from UE 1301, to MEC 1407-1 instead of to a core network via CU 1405. MEC 1407-1 may process the traffic, perform one or more computations based on the received traffic, and may provide traffic to UE 1301 via RU 1401-1. In some embodiments, MEC 1407 may include, and/or may implement, some or all of the functionality described above with respect to DLMAS 101, DLMS 103, node 201, AF 1330, UPF 1335, and/or one or more other devices, systems, VNFs, CNFs, etc. In this manner, ultra-low latency services may be provided to UE 1301, as traffic does not need to traverse DU 1403, CU 1405, links between DU 1403 and CU 1405, and an intervening backhaul network between RAN environment 1400 and the core network.

Figure 15:
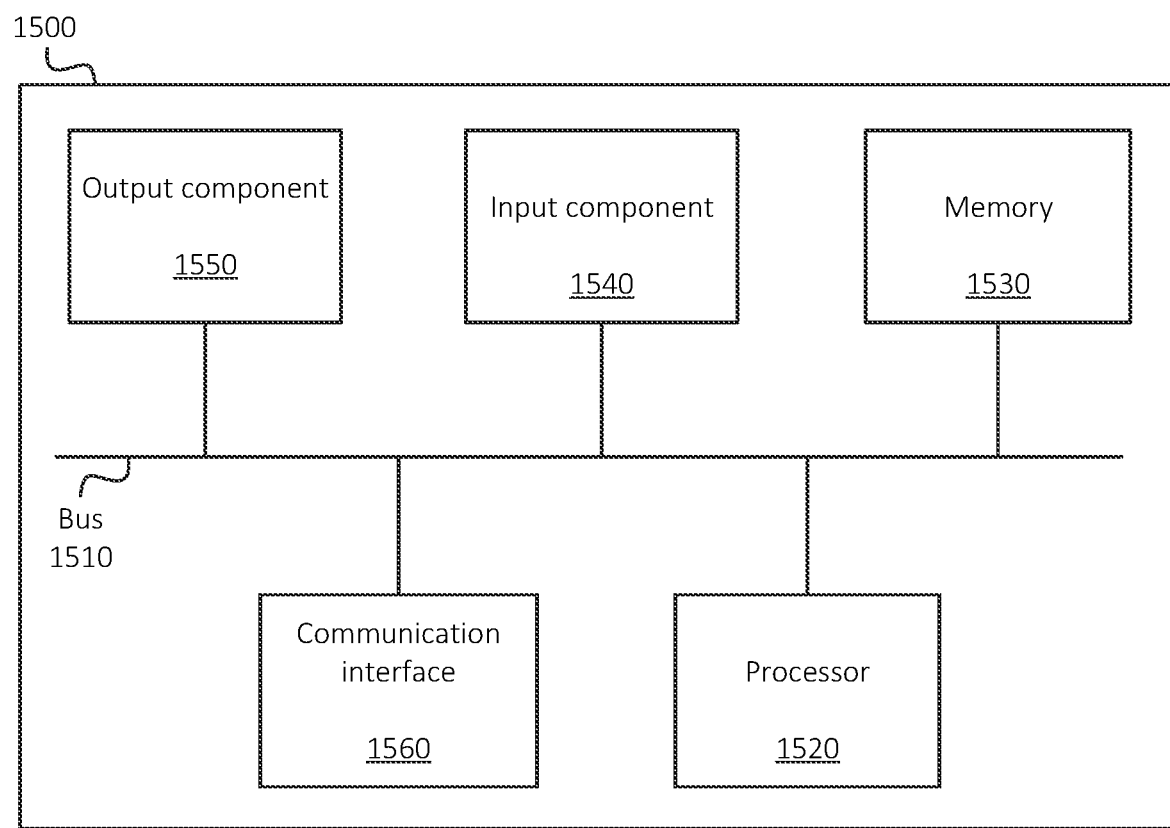
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. In some embodiments, processor 1520 may be or may include one or more hardware processors. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to input component 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-12), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors; and
   a memory with stored instructions that, when executed by the one or more processors, cause the one or more processors configured to perform operations to:
      receive a request to migrate a first distributed ledger, maintained by a first set of nodes associated with a first distributed ledger management system, to a second set of nodes associated with a second distributed ledger management system;
      identify, based on the request, information recorded to the first distributed ledger, the information comprising world state information that includes a set of keys and one or more values for each key of the set of keys;
      generate first verification information based on the information recorded to the first distributed ledger;
      instruct, based on the request, the second distributed ledger management system to establish a second distributed ledger, wherein the second set of nodes associated with the second distributed ledger management system maintains the second distributed ledger based on the instructing;
      instruct, further based on the request, the second distributed ledger management system to record the information, recorded to the first distributed ledger, to the second distributed ledger, wherein instructing the second distributed ledger management system to record the information to the second distributed ledger includes providing the set of keys and the one or more values for each key of the set of keys to the second distributed ledger management system;
      generate, after the instructing the second distributed ledger management system to record the information to the second distributed ledger, second verification information based on the information recorded to the second distributed ledger;
      verify that the first distributed ledger has been migrated to the second set of nodes associated with the second distributed ledger management system, wherein the verifying includes comparing the first verification information to the second verification information;
      output, via an output component of the device, an indication that the first distributed ledger, maintained by the first set of nodes associated with the first distributed ledger management system, has been migrated to the second set of nodes associated with the second distributed ledger management system; and
      record, to the first distributed ledger and after verifying that the first distributed ledger has been migrated to the second set of nodes associated with the second distributed ledger management system, an identifier of the second distributed ledger management system or of the second distributed ledger.

2. The device of claim 1, wherein comparing the first verification information to the second verification information includes determining that the first and second verification information both include a same value.

3. The device of claim 1, wherein the first verification information includes a first value generated by performing a particular operation based on the information recorded to the first distributed ledger, and wherein the second verification information includes a second value generated by performing the same particular operation based on the information recorded to the second distributed ledger.

4. The device of claim 3, wherein the particular operation includes a cryptographic hashing operation.

5. The device of claim 1, wherein the first distributed ledger management system is associated with a first distributed ledger framework, and wherein the second distributed ledger management system is associated with a second distributed ledger framework.

6. The device of claim 1, wherein the set of keys includes a particular key, wherein the one or more values for the particular key include a first value for the particular key and a second value for the particular key.

7. The device of claim 6, wherein the first value for the particular key is associated with a first timestamp, and wherein the second value for the particular key is associated with a second timestamp.

8. A non-transitory computer-readable medium, storing a plurality of processor-executable instructions to:
   receive a request to migrate a first distributed ledger, maintained by a first set of nodes associated with a first distributed ledger management system, to a second set of nodes associated with a second distributed ledger management system;
   identify, based on the request, information recorded to the first distributed ledger the information comprising world state information that includes a set of keys and one or more values for each key of the set of keys;
   generate first verification information based on the information recorded to the first distributed ledger;
   instruct, based on the request, the second distributed ledger management system to establish a second distributed ledger, wherein the second set of nodes associated with the second distributed ledger management system maintains the second distributed ledger based on the instructing;
   instruct, further based on the request, the second distributed ledger management system to record the information, recorded to the first distributed ledger, to the second distributed ledger, wherein instructing the second distributed ledger management system to record the information to the second distributed ledger includes providing the set of keys and the one or more values for each key of the set of keys to the second distributed ledger management system;

generate, after the instructing the second distributed ledger management system to record the information to the second distributed ledger, second verification information based on the information recorded to the second distributed ledger;

verify that the first distributed ledger has been migrated to the second set of nodes associated with the second distributed ledger management system, wherein the verifying includes comparing the first verification information to the second verification information;

output, via an output component, an indication that the first distributed ledger, maintained by the first set of nodes associated with the first distributed ledger management system, has been migrated to the second set of nodes associated with the second distributed ledger management system; and record, to the first distributed ledger and after verifying that the first distributed ledger has been migrated to the second set of nodes associated with the second distributed ledger management system, an identifier of the second distributed ledger management system or of the second distributed ledger.

9. The non-transitory computer-readable medium of claim 8, wherein comparing the first verification information to the second verification information includes determining that the first and second verification information both include a same value.

10. The non-transitory computer-readable medium of claim 8, wherein the first verification information includes a first value generated by performing a particular operation based on the information recorded to the first distributed ledger, and wherein the second verification information includes a second value generated by performing the particular operation based on the information recorded to the second distributed ledger.

11. The non-transitory computer-readable medium of claim 10, wherein the particular operation includes a cryptographic hashing operation.

12. The non-transitory computer-readable medium of claim 8, wherein the first distributed ledger management system is associated with a first distributed ledger framework, and wherein the second distributed ledger management system is associated with a second distributed ledger framework.

13. The non-transitory computer-readable medium of claim 8, wherein the set of keys includes a particular key, wherein the one or more values for the particular key include a first value for the particular key and a second value for the particular key.

14. The non-transitory computer-readable medium of claim 13, wherein the first value for the particular key is associated with a first timestamp, and wherein the second value for the particular key is associated with a second timestamp.

15. A method, implemented by a device, comprising:
receiving a request to migrate a first distributed ledger, maintained by a first set of nodes associated with a first distributed ledger management system, to a second set of nodes associated with a second distributed ledger management system;
identifying, based on the request, information recorded to the first distributed ledger, the information comprising world state information that includes a set of keys and one or more values for each key of the set of keys;
generating first verification information based on the information recorded to the first distributed ledger;
instructing, based on the request, the second distributed ledger management system to establish a second distributed ledger, wherein the second set of nodes associated with the second distributed ledger management system maintains the second distributed ledger based on the instructing;
instructing, further based on the request, the second distributed ledger management system to record the information, recorded to the first distributed ledger, to the second distributed ledger, wherein instructing the second distributed ledger management system to record the information to the second distributed ledger includes providing the set of keys and the one or more values for each key of the set of keys to the second distributed ledger management system;
generating, after the instructing the second distributed ledger management system to record the information to the second distributed ledger, second verification information based on the information recorded to the second distributed ledger;
verifying that the first distributed ledger has been migrated to the second set of nodes associated with the second distributed ledger management system, wherein the verifying includes comparing the first verification information to the second verification information;
outputting, via an output component of the device, an indication that the first distributed ledger, maintained by the first set of nodes associated with the first distributed ledger management system, has been migrated to the second set of nodes associated with the second distributed ledger management system; and
recording, to the first distributed ledger and after verifying that the first distributed ledger has been migrated to the second set of nodes associated with the second distributed ledger management system, an identifier of the second distributed ledger management system or of the second distributed ledger.

16. The method of claim 15, wherein comparing the first verification information to the second verification information includes determining that the first and second verification information both include a same value.

17. The method of claim 15, wherein the first verification information includes a first value generated by performing a cryptographic hashing operation based on the information recorded to the first distributed ledger, and wherein the second verification information includes a second value generated by performing the same cryptographic hashing operation based on the information recorded to the second distributed ledger.

18. The method of claim 15, wherein the first distributed ledger management system is associated with a first distributed ledger framework, and wherein the second distributed ledger management system is associated with a second distributed ledger framework.

19. The method of claim 15, wherein the set of keys includes a particular key, wherein the one or more values for the particular key include a first value for the particular key and a second value for the particular key.

20. The method of claim 19, wherein the first value for the particular key is associated with a first timestamp, and wherein the second value for the particular key is associated with a second timestamp.

* * * * *